US009827826B2

(12) United States Patent
Ota et al.

(10) Patent No.: US 9,827,826 B2
(45) Date of Patent: Nov. 28, 2017

(54) VEHICLE AIR CONDITIONER WITH IDLING STOP RESPONSIVE CONTROL

(71) Applicant: DENSO CORPORATION, Kariya, Aichi-pref. (JP)

(72) Inventors: Koji Ota, Kariya (JP); Yasuhiro Sagou, Chiryu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 503 days.

(21) Appl. No.: 14/391,118

(22) PCT Filed: Apr. 1, 2013

(86) PCT No.: PCT/JP2013/002237
§ 371 (c)(1),
(2) Date: Oct. 7, 2014

(87) PCT Pub. No.: WO2013/153768
PCT Pub. Date: Oct. 17, 2013

(65) Prior Publication Data
US 2015/0114016 A1 Apr. 30, 2015

(30) Foreign Application Priority Data
Apr. 11, 2012 (JP) .................................. 2012-090196

(51) Int. Cl.
*B60H 1/32* (2006.01)
*B60H 1/00* (2006.01)

(52) U.S. Cl.
CPC ..... *B60H 1/00778* (2013.01); *B60H 1/00742* (2013.01); *B60H 1/00821* (2013.01); *B60H 1/3204* (2013.01)

(58) Field of Classification Search
CPC .............. B60H 1/0078; B60H 1/00742; B60H 1/00764; B60H 1/00821; B60H 1/00778;
(Continued)

(56) References Cited

U.S. PATENT DOCUMENTS

2011/0114739 A1* 5/2011 Misumi .............. B60H 1/00742
236/49.3
2012/0142264 A1 6/2012 Sagou et al.

FOREIGN PATENT DOCUMENTS

JP 2004130913 A 4/2004
JP 2005145327 A 6/2005
(Continued)

OTHER PUBLICATIONS

International Search Report and Written Opinion (in Japanese with English Translation) for PCT/JP2013/022337, dated Jun. 25, 2013; ISA/JP.

*Primary Examiner* — Jonathan Bradford
(74) *Attorney, Agent, or Firm* — Harness, Dickey & Pierce, P.L.C.

(57) ABSTRACT

When an air conditioning ECU determines that it is immediately before idling stop, the air conditioning ECU implements a front seat air conditioning mode even if the air conditioning ECU determines that an occupant intensive air-conditioning mode can be implemented. Accordingly, the air conditioning ECU controls opening and closing mechanisms so as to blow a conditioned air from driver's seat side outlet ports, and also blow the conditioned air from a passenger's seat side foot outlet port. Hence, in cooling operation, since a temperature increase of air drawn into an inside air inlet port is limited when the idling stop is carried out, temperature increase of air blown into the vehicle interior from the outlet port can be restricted. In other words, a temperature change in the vehicle interior can be limited when a travel engine stops due to the idling stop.

21 Claims, 15 Drawing Sheets

(58) Field of Classification Search
CPC .. B60H 1/00771; B60H 1/322; B60H 1/3208; B60H 2001/00192; B60H 2001/002; B60H 2001/3266; B60H 2001/3273; B60H 2001/3282
See application file for complete search history.

(56) References Cited

FOREIGN PATENT DOCUMENTS

| | | |
|---|---|---|
| JP | 2006224744 A | 8/2006 |
| JP | 2009292293 A | 12/2009 |
| JP | 2011105283 A | 6/2011 |
| JP | 2011121572 A | 6/2011 |
| JP | 2012136212 A | 7/2012 |

* cited by examiner

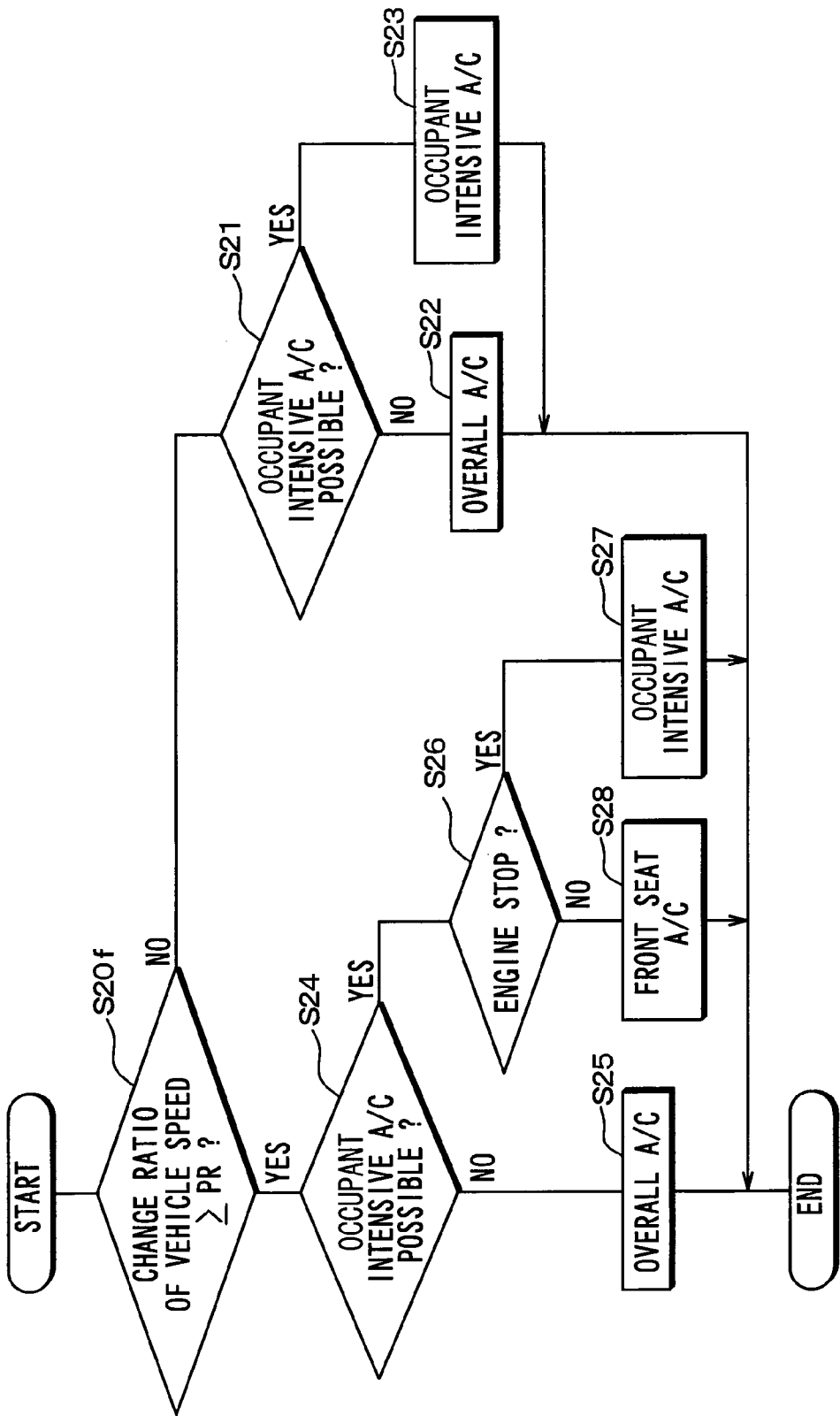

VEHICLE AIR CONDITIONER WITH IDLING STOP RESPONSIVE CONTROL

CROSS REFERENCE TO RELATED APPLICATIONS

This application is a U.S. National Phase Application under 35 U.S.C. 371 of International Application No. PCT/JP2013/002237 filed on Apr. 1, 2013 and published in Japanese as WO 2013/153768 A1 on Oct. 17, 2013. This application is based on and claims the benefit of priority from Japanese Patent Application No. 2012-090196 filed on Apr. 11, 2012. The entire disclosures of all of the above applications are incorporated herein by reference.

TECHNICAL FIELD

The present disclosure relates to a vehicle air conditioner.

BACKGROUND ART

Up to now, there is a disclosure of an occupant intensive air-conditioning mode control that limits an air blowing rate blown out of a conditioned air outlet port facing the seat in which no passenger is seated if it is detected that a passenger is not seated in a seat (for example, a passenger seat) other than a driver's seat in a vehicle air conditioner (refer to Patent Document 1).

Also, conventionally, an idling stop system is known, which automatically stops an engine when a driver stops a vehicle to wait for a traffic light.

Patent Document 1: JP 2005-145327 A

SUMMARY OF THE INVENTION

The present inventors of this application have studied that the vehicle air conditioner having the above occupant intensive air-conditioning mode control and an air conditioning compressor that operates by an output of a travel engine is applied to an automobile having the above idling stop system.

For example, in summer (that is, in cooling operation), if the occupant intensive air-conditioning mode control is implemented, a cold air from the conditioning air blowing port is blown to a driver's seat side, but the cold air from the conditioning air blowing port is not blown to a passenger's seat side. For that reason, in summer, when the engine stops due to the idling stop, and the air conditioning system compressor stops during implementation of the occupant intensive air-conditioning mode control, a room temperature of a passenger's seat side space within a vehicle interior may rise early.

In this example, when an inside air inlet port of the vehicle air conditioner is opened at the passenger's seat side within the vehicle interior, if the air conditioning system compressor stops, a temperature of the inside air sucked into the inside air inlet port may rise early. Therefore, there is a case in which an air temperature blown out of the conditioned air outlet port rises early, as a result of which the temperature of the vehicle interior rises early.

That is, when the travel engine stops due to the idling stop during the implementation of the occupant intensive air-conditioning mode control, the temperature of the vehicle interior may change early.

In view of the above circumstances, the present disclosure aims at providing a vehicle air conditioner that suppresses a change in the temperature of the vehicle interior when the travel engine stops due to the idling stop.

A vehicle air conditioner includes a heat exchanger, a plurality of outlet ports, a blowing control mechanism, an idling stop determination unit, an air-conditioning-mode determination unit, a first air conditioning control unit and a second air conditioning control unit. In the heat exchanger, heat is exchanged between a heat medium that changes in temperature due to an energy output from a travel engine of an automobile and an inside air drawn through an inside air inlet port. At least one of the plurality of outlet ports is disposed for each of seats of the automobile, and the plurality of outlet ports are ports through which a conditioned air that has passed through the heat exchanger is blown out. The blowing control mechanism permits or stops the blowing out of the conditioned air from the outlet port provided for each of the seats. The idling stop determination unit determines whether it is immediately before idling stop in which the travel engine stops. The air-conditioning-mode determination unit determines whether an occupant intensive air-conditioning mode, in which the conditioned air is blown intensively to an occupant, can be performed. The first air conditioning control unit controls the blowing control mechanism to blow the conditioned air from at least one of the plurality of outlet ports, and the at least one of the plurality of outlet ports corresponds to a seated seat in which an occupant is seated. The second air conditioning control unit that controls the blowing control mechanism to blow the conditioned air from at least one of the plurality of outlet ports, and the at least one of the plurality of outlet ports corresponds to an unseated seat in which an occupant is not seated. The first air conditioning control unit operates when the idling stop determination unit determines that it is not immediately before the idling stop, and when the air-conditioning-mode determination unit determines that the occupant intensive air-conditioning mode can be implemented. The second air conditioning control unit operates when the idling stop determination unit determines that it is immediately before the idling stop, and when the air-conditioning-mode determination unit determines that the occupant intensive air-conditioning mode can be implemented.

In the present specification, the idling stop means that the travel engine stops when the vehicle stops temporarily due to traffic jam or waiting at stoplights. The inside air means the air within the vehicle interior.

According to the above-described aspect of the present disclosure, when the air-conditioning-mode determination unit determines that the occupant intensive air-conditioning mode can be implemented, the first air conditioning control unit controls the blowing control mechanism so that a conditioned air can be blown out of only an outlet port of the outlet ports provided for the respective seats, corresponding to a seated seat in which the occupant is seated. In addition, the second air conditioning control unit can blow the conditioned air from the outlet port of the outlet ports provided for the respective seats, corresponding to the seat in which the occupant is not seated, even if the occupant intensive air-conditioning mode can be implemented when it is determined that it is immediately before the idling stop.

Therefore, in summer (that is, in cooling operation), since a temperature change of the air sucked into the inside air inlet port when the idling stop is carried out can be limited, increase of the air temperature blown into the vehicle interior from the outlet port can be restricted. Therefore, increase of the temperature within the vehicle interior can be limited.

On the other hand, in winter (that is, in heating operation), since the temperature change of the air sucked into the inside air inlet port when the idling stop is carried out can be limited, decrease of the air temperature blown into the vehicle interior from the outlet port can be restricted. Therefore, reduction of the temperature within the vehicle interior can be limited.

As described above, since a temperature change of the air drawn into the inside air inlet port can be limited when the idling stop is carried out. Thus, a temperature change of air blown into the vehicle interior from the outlet port can be restricted. Therefore, the temperature change within the vehicle interior can be limited.

Also, when it is determined that it is immediately before the idling stop, and when the occupant intensive air-conditioning mode is performed without blowing of the conditioned air from the outlet port corresponding to the seat in which the occupant is not seated, the temperature of air drawn into the inside air inlet port changes early. As a result, the air temperature blown into the vehicle interior from the outlet port may change early. For that reason, if a period during which the idling stop is implemented is prolonged, the inside temperature may depart largely from a set temperature.

On the contrary, according to the above-described aspect of the present disclosure, when it is determined that it is immediately before the idling stop, as described above, the conditioned air can be blown out of the outlet port corresponding to the seat in which the occupant is not seated. Hence, the temperature change of air blown from the outlet port into the vehicle interior can be restricted. As a result, the period during which the idling stop is implemented can be prolonged.

BRIEF DESCRIPTION OF THE DRAWINGS

FIG. 19 is a flowchart illustrating a sub control process of an electronic control device according to another modification of the fifth embodiment.

EMBODIMENTS FOR EXPLOITATION OF THE INVENTION

Figure 1:
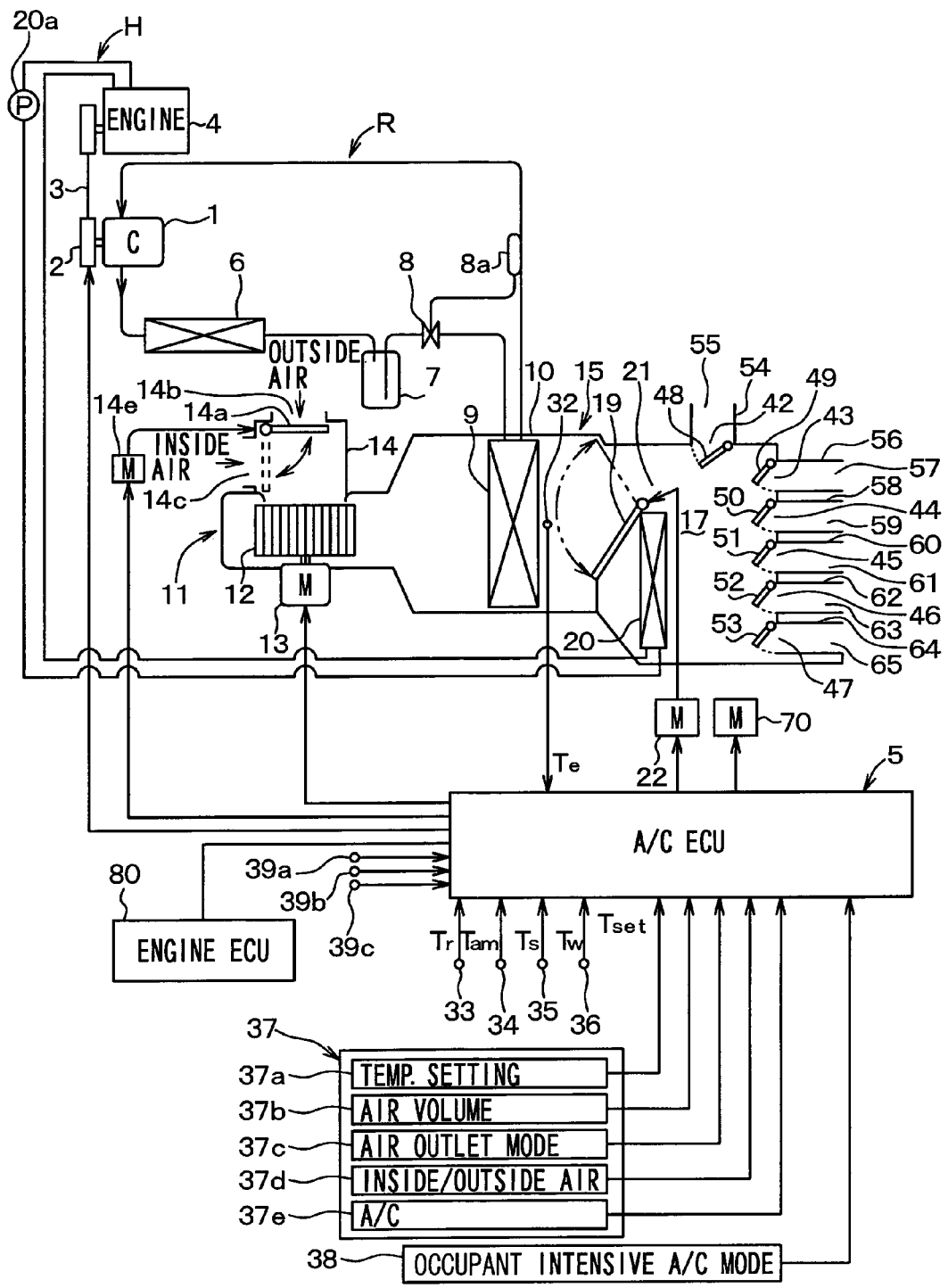
FIG. 1 is a schematic diagram illustrating a vehicle air conditioner according to a first embodiment of the present disclosure.

Hereinafter, multiple embodiments for implementing the present invention will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

Figure 2:
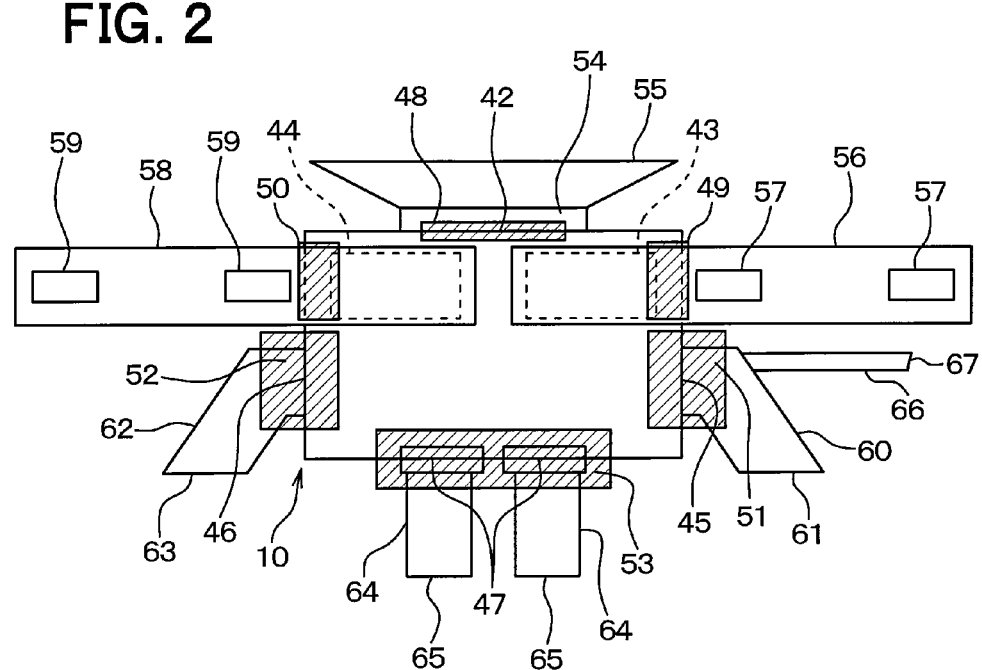
FIG. 2 is a schematic view illustrating an arrangement of multiple outlet ports according to the first embodiment.
Figure 3:
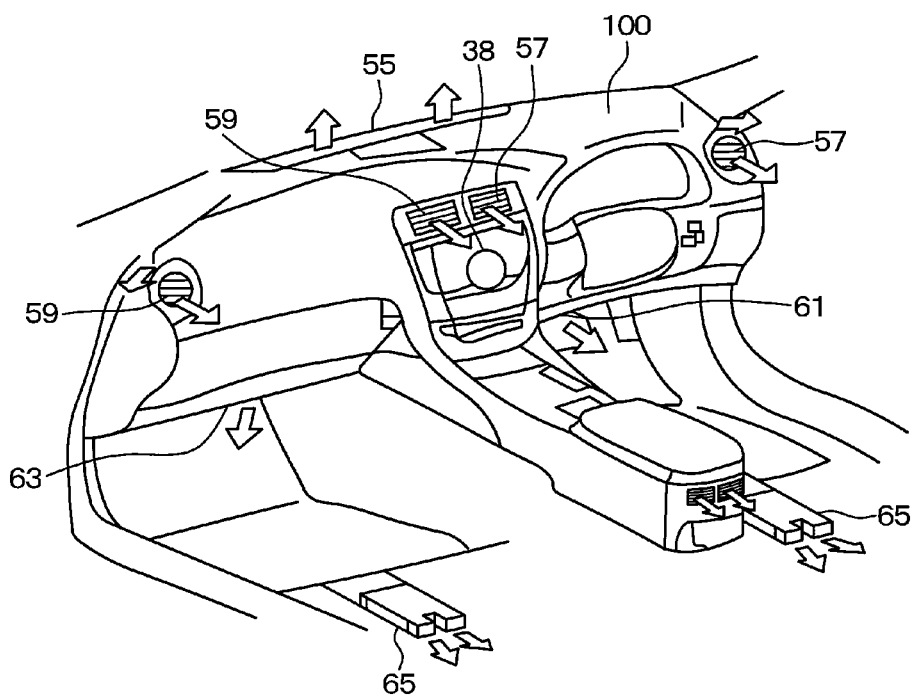
FIG. 3 is a schematic view illustrating an arrangement of multiple outlet ports within a vehicle interior according to the first embodiment.

FIGS. 1 to 3 illustrate a vehicle air conditioner according to the present embodiment. FIG. 1 is a diagram illustrating an overall configuration of a vehicle air conditioner according to the present embodiment. FIG. 2 is a top view of the vehicle air conditioner according to the present embodiment, and FIG. 3 is a diagram illustrating a vehicle interior outlet port of the vehicle air conditioner according to the present embodiment.

A vapor compression refrigeration cycle device R of a vehicle air conditioner in FIG. 1 is equipped with a compressor 1 that sucks, compresses, and discharges a refrigerant by a kinetic energy output from a travel engine 4. Specifically, the compressor 1 has an electromagnetic clutch 2, and the kinetic energy (motive power) output from the travel engine 4 is transmitted to the compressor 1 through the electromagnetic clutch 2 and a belt 3. The energization to the electromagnetic clutch 2 is intermittently implemented by an electronic control unit (hereinafter referred to as "air conditioning ECU 5"), and the operation of the compressor 1 is intermittently conducted by the energization to the electromagnetic clutch 2.

A fixed displacement compressor having a constant refrigerant discharge capacity is used as the compressor 1. An overheated gas refrigerant, which is discharged from the compressor 1 and has a high temperature and a high pressure, flows into a condenser 6 (cooler), and exchanges heat with an outside air blown from a cooling fan not shown in the compressor with the result that the refrigerant is cooled and condensed. The refrigerant condensed in the condenser 6 then flows into a liquid receiver 7, and the refrigerant is separated into gas and liquid within the liquid receiver 7, and an excess refrigerant (liquid refrigerant) within the vapor compression refrigeration cycle device R is stored in the liquid receiver 7.

The liquid refrigerant from the liquid receiver 7 is decompressed to a low pressure by an expansion valve (decompressor) 8 into a gas-liquid two-phase state at low temperature and low pressure. The expansion valve 8 is a thermal expansion valve having a temperature sensor 8a that senses a temperature of an outlet refrigerant in the evaporator 9. The low-temperature and low-pressure refrigerant from the expansion valve 8 flows into an evaporator (cooling heat exchanger) 9. The evaporator 9 is installed within an air conditioning case 10 of the vehicle air conditioner, and the low-temperature low-pressure refrigerant that has flowed into the evaporator 9 is evaporated with the absorption of heat from air within the air conditioning case 10. An exit of the evaporator 9 is coupled with an intake side of the compressor 1, and a closed circuit is configured by the above cycle components.

In the air conditioning case 10, a blower 11 is arranged on an upstream side of the evaporator 9, and the blower 11 is equipped with a centrifugal blower fan 12 and a blower drive motor 13. An inside/outside air switching box 14 is arranged on an intake side of the blower fan 12, and an outside air inlet port 14b and an inside air inlet port 14c are opened or closed by an inside/outside air switching door 14a in the inside/outside air switching box 14. With the above configuration, the outside air (vehicle exterior air) or the inside air (vehicle interior air) is selectively introduced into the inside/outside air switching box 14. The inside air inlet port 14c is opened downward on the passenger's seat side in the vicinity of a vehicle interior dashboard 100. The inside/outside air switching door 14a is driven by a servo motor 14e.

In the vehicle air conditioner, an air conditioning unit 15 arranged on a downstream side of the blower 11 is arranged in the center of an inside of the dashboard in a vehicle interior front portion, and the blower 11 is arranged to deviate to the passenger's seat side of the air conditioning unit 15.

An air mix door 19 is arranged on the downstream side of the evaporator 9 within the air conditioning case 10. A hot water heater core (heating heat exchanger) 20 that heats the inside air (or the outside air) with a coolant (hot water) of the travel engine 4 as a heat source is installed on the downstream side of the air mix door 19.

The hot water heater core 20 configures a coolant circuit H, in which the coolant circulates, together with a heat exchanger (hereinafter referred to as "engine-cooling heat exchanger") that raises a temperature of the coolant by the aid of a thermal energy (waste heat) output from the travel engine 4. The coolant circuit H is equipped with a water pump 20a that operates due to a kinetic energy (drive force) output from the travel engine 4. The a water pump 20a operates due to the kinetic energy from the travel engine 4, and urges the coolant in the coolant circuit H to circulate the coolant between the hot water heater core 20 and the engine-cooling heat exchanger.

A bypass passage 21 that bypasses the hot water heater core 20, and allows air to flow therein is formed on the side (upper portion in the figure) of the hot water heater core 20 according to the present embodiment. The air mix door 19 is formed of a rotatable plate-shaped door, and driven by a servo motor 22. The air mix door 19 is configured to adjust an air volume rate of a hot air that passes through the hot water heater core 20, and a cold air that passes through the bypass passage 21, and adjusts a blowing air temperature into the vehicle interior with the adjustment of the air volume rate of the cold and hot air.

The hot air from the hot water heater core 20 is mixed with the cold air from the bypass passage 21 in an air mixing unit 17, to enable a conditioned air of a desired temperature to be created. Further, blowing opening portions 42 to 47 illustrated in FIG. 2 are disposed on the downstream side of the air mixing unit 17 within the air conditioning case 10 for the purpose of blowing the conditioned air created within a casing 11 into the vehicle interior which is a space to be air-conditioned. The blowing opening portions 42 to 47 are opened or closed by opening and closing mechanisms 48 to 53.

In the present embodiment, the blowing opening portions 42 to 47 are configured by a defroster opening portion 42, a driver's seat face opening portion 43, a passenger's seat side face opening portion 44, a driver's seat side foot opening portion 45, a passenger's seat side foot opening portion 46, and a rear seat side foot opening portion 47, respectively.

The opening and closing mechanisms 48 to 53 are configured by a defroster opening and closing mechanism 48, a driver's seat side face opening and closing mechanism 49, a passenger's seat side face opening and closing mechanism 50, a driver's seat side foot opening and closing mechanism 51, a passenger's seat side foot opening and closing mechanism 52, and a rear seat side foot opening and closing mechanism 53, respectively. The opening and closing mechanisms 48 to 53 are configured by respective doors that open and close the blowing opening portions 42 to 47. The opening and closing mechanisms 48 to 53 are rotationally driven by a servo motor 70 through a link mechanism.

The opening and closing mechanisms 48 to 53 may be disposed within the casing 11, or may be disposed outside of the casing 11. Also, the opening and closing mechanisms 48 to 53 may be of an attachment structure.

In this example, as illustrated in FIGS. 2 and 3, the defroster opening portion 42 is connected with a defroster duct 54 made of resin, and the conditioned air is blown toward an inner surface of a vehicle front window glass from a defroster outlet port 55 on a leading end of the defroster duct.

The driver's seat face opening portion 43 is connected with a driver's seat side face duct 56 made of resin, and the conditioned air is blown toward an upper body of a driver in the driver's seat from a driver's seat side face outlet port 57 on a leading end of the driver's seat side face duct.

The passenger's seat side face opening portion 44 is connected with a passenger's seat side face duct 58 made of resin, and the conditioned air is blown toward an upper body of an occupant in the passenger's seat from a passenger's seat side face outlet port 59 on a leading end of the passenger's seat side face duct.

The driver's seat side foot opening portion 45 is connected with a driver's seat side foot duct 60 made of resin, and the conditioned air is blown toward a foot area portion of the driver on the driver's seat side from a driver's seat side foot outlet port 61 on a leading end of the driver's seat side foot duct.

The passenger's seat side foot opening portion 46 is connected with a passenger's seat side foot duct 62 made of resin, and the conditioned air is blown toward a foot area portion of the occupant on the passenger's seat side from a passenger's seat side foot outlet port 63 on a leading end of the passenger's seat side foot duct.

The rear seat side foot opening portion 47 is connected with a rear seat side foot duct 64 made of resin, and the conditioned air is blown toward a foot area portion of the occupant on the rear seat side from a rear seat side foot outlet port 65 on a leading end of the rear seat side foot duct.

A driver's seat side knee duct 66 (refer to FIG. 2) diverges from the driver's seat side foot duct 60, and the conditioned air is blown toward a knee portion of the driver on the driver's seat side from a driver's seat side knee outlet port 67 on a leading end of the driver's seat side knee duct.

In this example, the driver's seat side outlet port includes the driver's seat side face outlet port 57, the driver's seat side foot outlet port 61, and the driver's seat side knee outlet port 67. The passenger's seat side outlet port includes the passenger's seat side face outlet port 59, and the passenger's seat side foot outlet port 63.

Subsequently, an outline of the electric control unit according to the present embodiment will be described.

The air conditioning ECU 5 in FIG. 1 includes a known microcomputer having a CPU, a ROM, and a RAM, and peripheral circuits thereof. The air conditioning ECU 5 implements an air conditioning control process with the execution of a computer program. The air conditioning ECU 5 controls the electromagnetic clutch 2, the servo motors 14e, 22, 70, and the blower drive motor 13 on the basis of detection signals of sensors 32 to 36, 38, and 39a to 39c, output signals of switches 37a to 37e, and an output signal of an engine ECU 80, respectively, in implementing the air conditioning control process.

The sensor 32 is arranged in a region on the downstream side of the evaporator 9 in the air flow, and detects an air temperature Te blown from the evaporator 9. The inside air sensor 33 detects a temperature (hereinafter referred to as "room temperature Tr") of air in the vehicle interior. The sensor 34 detects a temperature (hereinafter referred to as "ambient temperature Tam") of air outside the vehicle interior. The sensor 35 detects the amount of solar radiation Ts in the vehicle interior. The sensor 36 detects a temperature Tw of the coolant for the travel engine 4. The switch 38 is an intensive-air-conditioning setting switch operated by the occupant to set the occupant intensive air-conditioning mode which will be described later.

The sensor 39a is a seating sensor for detecting whether the driver is seated in the driver's seat, or not.
The sensor 39b is a seating sensor for detecting whether the occupant is seated in the passenger's seat, or not. The sensor 39c is a seating sensor for detecting whether the occupant is seated in the rear seat, or not.

The sensors 39a to 39c of the present embodiment are, for example, switches that turn on (or off) upon seating the occupant in the seat, or optical sensors for detecting whether the occupant who is seated in the seat is present, or not.

The operation switch 37a is a temperature setting switch for setting a set temperature Tset. The operation switch 37b is a setting switch for setting an air volume. The operation switch 37c is a switch for setting a blowing mode. The operation switch 37d is a switch for driving the inside/outside air switching door 14a. The operation switch 37e is a switch for driving and stopping the compressor 1. The operation switches 37a to 37e are disposed on an air conditioning control panel 37. The temperature setting switch 37a may be used as an example of a temperature setting device that sets a set temperature of the air temperature in the vehicle interior.

The engine ECU 80 is an electronic control unit for controlling the travel engine 4, and outputs a signal indicative of an operation state of the travel engine 4 to the air conditioning ECU 5. The engine ECU 80 of the present embodiment implements the idling stop on the travel engine 4. The idling stop means that the travel engine 4 stops when the vehicle stops temporarily, for example, due to traffic jam or waiting at stoplights.

Figure 4:
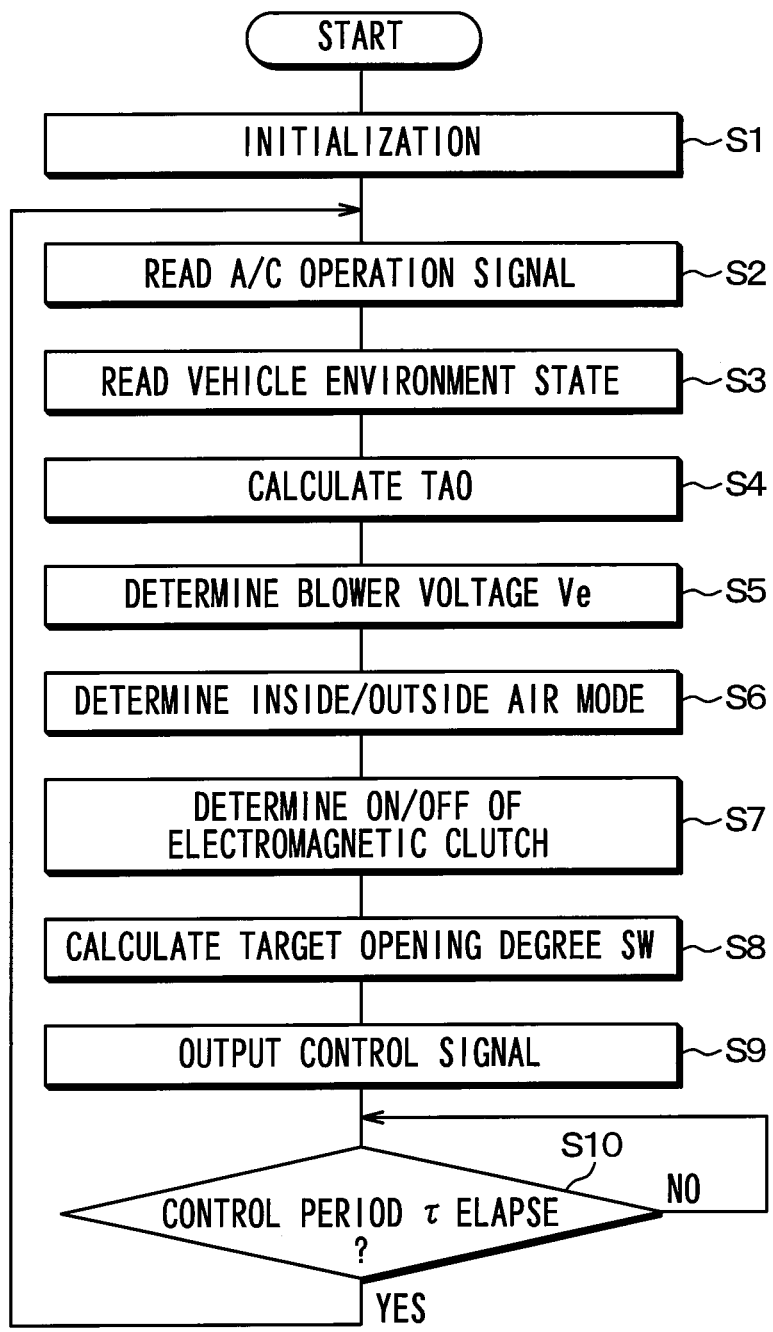
FIG. 4 is a flowchart illustrating a main control process of an electronic control device according to the first embodiment.
Figure 5:
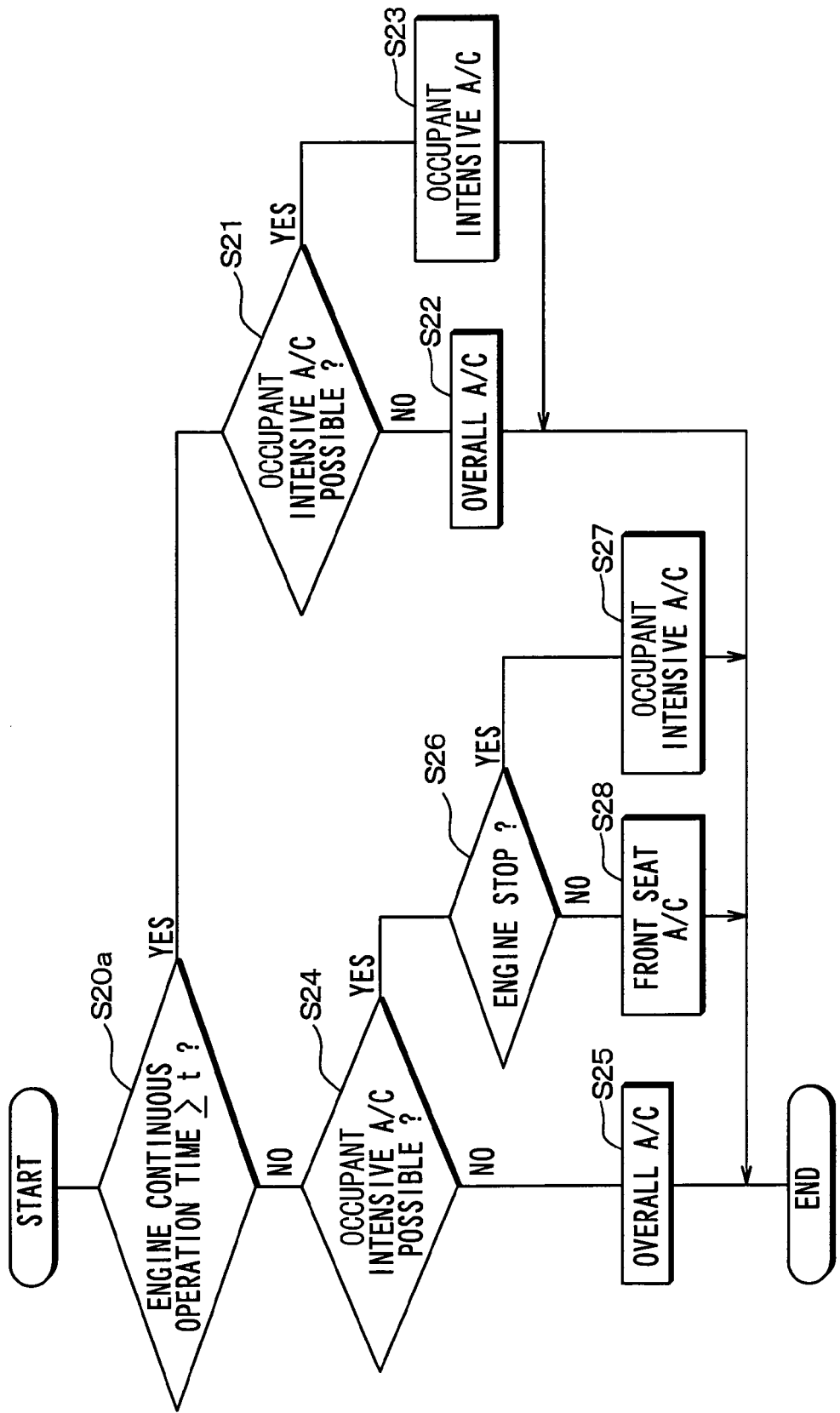
FIG. 5 is a flowchart illustrating a sub control process of the electronic control device according to the first embodiment.

Subsequently, the operation of the present embodiment based on the above configuration will be described. The air conditioning ECU 5 implements the air conditioning control process according to a computer program. The air conditioning control process includes a main control process of FIG. 4, and a sub control process of FIG. 5. FIG. 4 is a flowchart illustrating the main control process, and FIG. 5 is a flowchart illustrating the sub control process.

The air conditioning ECU 5 alternately repetitively executes the main control process and the sub control process. The execution of the main control process and the sub control process starts upon turning on the ignition switch of the travel engine 4. Hereinafter, the main control process and the sub control process will be described, separately.

The main control process will be described below. First, a flag and a timer are initialized in Step S1, and operation signals of the operation switches 37a to 37e on the air conditioning control panel 37 are read in subsequent Step S2. Signals of a vehicle environment state, that is, detection signals from the sensors 32 to 36, 38, 39a, 39b, and 39c are read in subsequent Step S3.

Subsequently, the target blowing temperature TAO of the conditioned air blown into the vehicle interior is calculated in Step S4. The target blowing temperature TAO is a blowing temperature necessary to maintaining the vehicle interior at the set temperature Tset of the temperature setting switch 37a, and calculated on the basis of the following Mathematical Expression 1.

$$TAO = Kset \times Tset - Kr \times Tr - Kam \times Tam - Ks \times Ts + C \quad \text{(Ex. 1)}$$

where Tr is a room temperature detected by the inside air sensor 33,

Tam is an ambient temperature detected by the outside air sensor 34,

Ts is the amount of solar radiation detected by the solar radiation sensor 35,

Kset, Kr, Kam, Ks are control gains, and

C is a correction constant.

Then, a target blowing rate of air blown by the blower 11, specifically, a blower voltage Ve which is an applied voltage of the blower drive motor 13 is determined on the basis of the target blowing temperature TAO in Step S5. A method of determining the blower voltage Ve is well known, and the blower voltage (target air volume) Ve is set to be larger on a high temperature side (maximum heating side) and a low temperature side (maximum cooling side) of the target blowing temperature TAO. The blower voltage (target air volume) Ve is set to be smaller in an intermediate temperature range of the target blowing temperature TAO.

Subsequently, the inside and outside air mode is determined in Step S6. For example, an entire inside air mode, an inside and outside air mixture mode, and an entire outside air mode may be switched in the stated order as the target blowing temperature TAO rises from the low temperature side to the high temperature side.

Subsequently, an on/off state of the electromagnetic clutch 2 is determined in Step S7. Specifically, the electromagnetic clutch 2 turns off when an evaporator blowing temperature Te from the sensor 32 is equal to or lower than a first target evaporator temperature Te1 (=3° C.). For that reason, the compressor 1 stops (turns off). Thereafter, the electromagnetic clutch 2 turns on, and the compressor 1 operates (turns on) if the evaporator blowing temperature Te becomes higher than a second target evaporator temperature Te2 (>first target evaporator temperature Te1). Then, the electromagnetic clutch 2 turns off if the evaporator blowing temperature Te becomes equal to or lower than the first target evaporator temperature Te1, and thereafter the electromagnetic clutch 2 turns on, and the compressor 1 operates (turns on) if the evaporator blowing temperature Te becomes higher than the second target evaporator temperature Te2. As described above, the electromagnetic clutch 2 turns on or off by comparison of the evaporator blowing temperature Te with the first and second target evaporator temperatures Te1 and Te2. With the above operation, the compressor 1 intermittently operates with the result that the evaporator blowing temperature Te can be brought closer to a desired temperature.

Subsequently, a target opening SW of the air mix door 19 is calculated on the basis of the target blowing temperature TAO, the evaporator blowing temperature Te, and the hot water temperature Tw according to the following Mathematical Expression 2, in Step S8.

$$SW=[(TAO-Te)/(Tw-Te)]\times 100(\%) \qquad (Ex.\ 2)$$

In this example, the target opening SW of the air mix door 19 is expressed in percentage with a maximum cooling position (solid position in FIG. 1) of the air mix door 19 as 0%, and a maximum heating position (dashed position in FIG. 1) of the air mix door 19 as 100%.

Subsequently, the process proceeds to Step S9, and control signals are output to various actuator units (2, 13, 14e, 22, 70) so as to obtain a control state determined in the above Steps S5 to S8. If the elapse of a control period τ is determined in subsequent Step S10, the process returns to Step S2. A portion of the air conditioning ECU 5 which conducts the control operation in Steps S4 to S5 may exemplify a temperature control unit that controls the air temperature blown from the outlet port so as to bring the temperature of the conditioned air blown from the outlet port closer to the set temperature set by a temperature setting device (37a) or the target blowing temperature TAO. Also, a portion of the air conditioning ECU 5 that conducts the control operation in Step S4 may exemplify a temperature calculation unit that calculates the target blowing temperature TAO.

The sub control process will be described below. First, it is determined whether it is immediately before the idling stop, or not, in Step S20a of FIG. 5. A portion of the air conditioning ECU 5 which conducts the control operation in Step S20a may exemplify an idling stop determination unit that determines whether it is immediately before the idling stop, or not. In the present embodiment, it is determined whether a continuous operation time of the travel engine 4 is shorter than a given time t, or not, on the basis of a signal output from the engine ECU 80, to thereby determine whether it is immediately before the idling stop, or not. In this situation, if the continuous operation time of the travel engine 4 is equal to or longer than the predetermined time t, it is determined that it is not immediately before the idling stop, as yes. In this case, in the present embodiment, it is assumed that the subject automobile travels on a highway or a motorway.

Then, it is determined whether the occupant intensive air-conditioning mode can be implemented, or not, in Step S21. The occupant intensive air-conditioning mode is a mode for blowing the conditioned air from only the driver's seat side outlet ports among the driver's seat side outlet ports (57, 61, 67), the passenger's seat side outlet ports (59, 63), and the rear seat side outlet port 65.

In the present embodiment, it is determined whether the occupant intensive air-conditioning mode is set by the switch 38, or not, to determine whether the occupant intensive air-conditioning mode can be implemented, or not, in the above Step S21. In this situation, if the occupant intensive air-conditioning mode is not set by the switch 38, it is determined that the occupant intensive air-conditioning mode cannot be implemented as no in Step S21.

Subsequently, the overall air conditioning mode that conducts air conditioning on the overall vehicle interior is implemented in Step S22. Specifically, a blowing mode (hereinafter referred to as "four-seat blowing mode) in the overall air conditioning mode is determined according to the target blowing temperature TAO. The four-seat blowing mode is switched to a four-seat face mode, a four-seat bi-level mode, and a four-seat foot mode in the stated order as the TAO rises from the low temperature side to the high temperature side as well known. In order to implement the blowing mode determined as described above, the servo motor 70 is controlled. To achieve this control, the respective opening and closing mechanisms 49, 50, 51, 52, and 53 are driven. For that reason, any one mode of the four-seat face mode, the four-seat bi-level mode, and the four-seat foot mode is implemented. The opening and closing mechanisms 49 to 53 may exemplify a blowing control mechanism that permits and stops the blowing of the conditioned air from the outlet ports 57, 59, 61, 63, 65, and 67.

In this example, the four-seat face mode is a face mode for blowing the conditioned air from the face outlet ports 57 and 59. The four-seat bi-level mode is a bi-level mode for blowing the conditioned air from the face outlet ports 57, 59, and the foot outlet ports 61, 63, 65. The four-seat foot mode is a foot mode for blowing the conditioned air from the foot outlet ports 61, 63, and 65.

If the occupant intensive air-conditioning mode is set by the switch 38, it is determined that the occupant intensive air-conditioning mode can be implemented as yes in Step S21. Thereafter, the occupant intensive air-conditioning mode is implemented in Step S23. A portion of the air conditioning ECU 5 which conducts the control operation in Step S23 may exemplify a first air conditioning control unit that controls the blowing control mechanism so as to blow the conditioned air from the outlet port corresponding to the seated seat in which the occupant is seated.

Specifically, a blowing mode in the occupant intensive air-conditioning mode is determined according to the target blowing temperature TAO. The blowing mode is switched to a face mode, a bi-level mode, and a foot mode in the stated order as the TAO rises from the low temperature side to the high temperature side as well known. In order to implement the blowing mode determined as described above, the servo motor 70 is controlled. To achieve this control, the respective opening and closing mechanisms 49, 50, 51, 52, and 53 are driven. For that reason, any one mode of the face mode, the bi-level mode, and the foot mode is implemented.

In this example, the face mode is a face mode for blowing the conditioned air from the driver's seat side face outlet port 57. The bi-level mode is a mode for blowing the conditioned air from the driver's seat side face outlet port 57 and the driver's seat side foot outlet port 61. The foot mode is a foot mode for blowing the conditioned air from the driver's seat side foot outlet port 61.

If the continuous operation time of the travel engine 4 is shorter than the predetermined time t, it is determined that it is immediately before the idling stop, as no, in the above Step S20a. In this case, it is determined that the vehicle travels in an urban area where traffic lights are dense.

Then, it is determined whether the occupant intensive air-conditioning mode can be implemented, or not, in Step S24, like the above Step S21. A portion of the air conditioning ECU 5 which conducts the control operation in Step S24 may exemplify an air conditioning determination unit that determines whether the occupant intensive air-conditioning mode can be implemented, or not. In this situation, if the occupant intensive air-conditioning mode is not set by the switch 38, it is determined that the occupant intensive air-conditioning mode cannot be implemented as no in Step S24. In association with the above determination, the process proceeds to Step S25, and implements the overall air conditioning mode as in the above Step S22.

Also, if the occupant intensive air-conditioning mode is set by the switch 38, it is determined that the occupant intensive air-conditioning mode can be implemented as yes in Step S24. In association with the above determination, the process proceeds to Step S26, and determines whether the travel engine 4 is stopping, or not, on the basis of the signal output from the engine ECU 80. In this situation, if the travel engine 4 is stopping, it is determined as yes in Step S26. Thereafter, like the above Step S23, the occupant intensive air-conditioning mode is implemented in Step S27. A portion of the air conditioning ECU 5 which conducts the control operation of Step S27 may be also exemplified as the first air conditioning control unit.

If the travel engine 4 is operating in the above Step S26, the front seat air conditioning mode is implemented in Step S28. In this case, the blowing of the conditioned air from the rear seat side foot outlet port 65 stops, and the conditioned air is blown from the driver's seat side outlet port and the passenger's seat side outlet port. A portion of the air conditioning ECU 5 which conducts the control operation in Step S28 may exemplify a second air conditioning control unit that controls the blowing control mechanism so as to blow the conditioned air from the outlet port corresponding to the unseated seat in which the occupant is not seated.

In this situation, like the blowing mode in the occupant intensive air-conditioning mode, any one mode of the face mode, the bi-level mode, and the foot mode is determined according to the target blowing temperature TAO as the blowing mode of the driver's seat side outlet port. In addition, the foot mode for blowing the conditioned air from the passenger's seat side foot outlet port 63 is determined as the blowing mode of the passenger's seat side outlet port. In order to implement the blowing mode of the driver's seat side outlet port and the passenger's seat side outlet mode which are determined as described above, the servo motor 70 is controlled. To achieve this control, the respective opening and closing mechanisms 49, 50, 51, 52, and 53 are driven.

In this situation, the passenger's seat side foot opening and closing mechanism 52 is controlled through the servo motor 70 to make an opening area of the passenger's seat side foot opening portion 46 smaller than an opening area of the driver's seat side face opening portion 43 (or the driver's seat side foot opening portion 45) so that the conditioned air (hereinafter referred to as "passenger's seat air volume") blown from the passenger's seat side foot outlet port 63 has a constant volume smaller than the conditioned air blown from the driver's seat side outlet port.

Subsequently, a specific example of the operation of the present embodiment will be described.

First, when the automobile travels on a highway having no traffic jam, a continuous operation time of the travel engine 4 becomes equal to or longer than the predetermined time t, it is determined as yes in Step S20a. Also, if the occupant intensive air-conditioning mode is set by the switch 38, it is determined that the occupant intensive air-conditioning mode can be implemented as yes in Step S21. In association with the above determination, the occupant intensive air-conditioning mode is implemented (Step S23). On the other hand, if the occupant intensive air-conditioning mode is not set by the switch 38, it is determined that the occupant intensive air-conditioning mode cannot be implemented as no in Step S21. In association with the above determination, the overall air conditioning mode is implemented (Step S22).

When the automobile travels in an urban area where traffic lights are dense, an event to wait for a traffic light frequently occurs. For that reason, since the continuous operation time of the travel engine 4 is shorter than the predetermined time t, it is determined that it is immediately before the idling stop, as no in Step S20a. In this situation, if the occupant intensive air-conditioning mode is set by the switch 38, it is determined that the occupant intensive air-conditioning mode can be implemented as yes in Step S24.

In this situation, if the travel engine 4 is operating, it is determined as no in Step S26. In this case, the front seat air conditioning mode for blowing the conditioned air from the driver's seat side outlet port and the passenger's seat side outlet port is implemented (Step S28).

Thereafter, when the setting of the occupant intensive air-conditioning mode is maintained, and the travel of the automobile in the urban area continues, the determination of no in Step S20a, the determination of yes in Step S24, the determination of no in Step S26, and the front seat air conditioning mode control process (Step S28) are repeated. As a result, the conditioned air can be blown from the driver's seat side outlet port and the passenger's seat side outlet port.

Thereafter, when the automobile temporarily stops to wait for a traffic light, the engine ECU 80 implements the idling stop on the travel engine 4. In this case, it is determined that the travel engine 4 stops as yes in Step S26. In association with the above determination, the occupant intensive air-conditioning mode is implemented (Step S27). In this situation, the conditioned air can be blown from the driver's seat side outlet port in a state where the compressor 1 stops.

According to the present embodiment described above, when the air conditioning ECU 5 determines that the occupant intensive air-conditioning mode can be implemented, the air conditioning ECU 5 controls the opening and closing mechanisms 48 to 53 so as to blow the conditioned air from only the driver's seat side outlet ports (57, 61, 67) among the driver's seat side outlet port, the passenger's seat side outlet port, and the rear seat side foot outlet port 65. In addition, when the air conditioning ECU 5 determines that it is immediately before the idling stop, the air conditioning ECU 5 implements the front seat air conditioning mode (Step S28) even if the air conditioning ECU 5 determines that the occupant intensive air-conditioning mode can be implemented. With the above operation, the air conditioning ECU 5 controls the opening and closing mechanisms 48 to 53 so as to blow the conditioned air from the driver's seat side outlet port, and also blow the conditioned air from the passenger's seat side foot outlet port 63.

Figure 6:
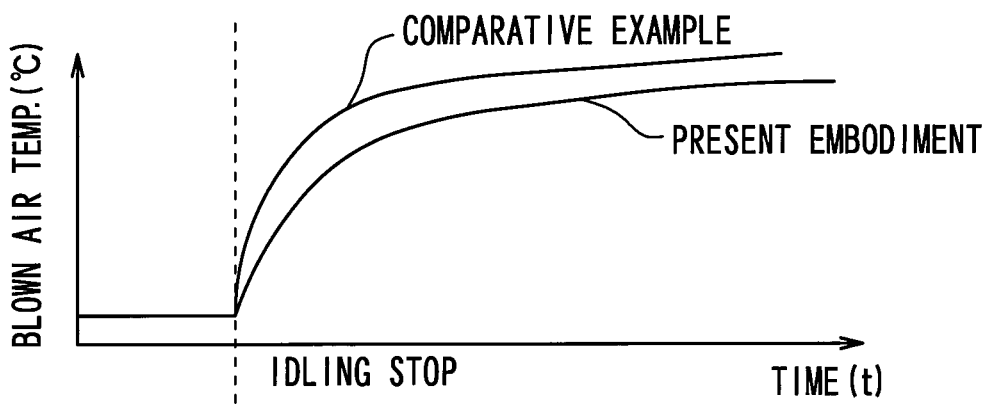
FIG. 6 is a diagram illustrating a change in blowing air temperature in the first embodiment and a comparative example.

In this example, in summer (that is, in cooling operation), in the comparative example in which the occupant intensive air-conditioning mode is implemented when it is determined that it is immediately before the idling stop, if the idling stop is carried out, the compressor 1 stops, and the operation of the vapor compression refrigeration cycle device R stops. In association with the above operation, the air temperature blown from the evaporator 9 rises. For that reason, the room temperature of the passenger's seat side space in the vehicle interior rises, and the temperature of air sucked into the inside air inlet port 14c rises. For that reason, there is a risk that the air temperature blown into the vehicle interior from the driver's seat side outlet port rises early (refer to FIG. 6). FIG. 6 is a graph showing a change in the blown air temperature when the axis of ordinate represents the blown air temperature blown into the vehicle interior from the outlet port, and the axis of abscissa represents a time.

On the contrary, in the present embodiment, when it is determined that it is immediately before the idling stop, the front seat air conditioning mode (Step S28) is implemented even if it is determined that the occupant intensive air-conditioning mode can be implemented. For that reason, the cold air can be blown from the passenger's seat side foot outlet port 63 as the conditioned air. Hence, the room temperature in the passenger's seat side space within the vehicle interior can drop. For that reason, since temperature increase of the air sucked into the inside air inlet port 14c when the idling stop is carried out can be limited, increase of the air temperature blown into the vehicle interior from the driver's seat side outlet port can be restricted (refer to FIG. 6).

On the other hand, in winter (that is, in heating operation), in the comparative example in which not front seat air conditioning mode in Step S28, but the occupant intensive air-conditioning mode is implemented when it is determined that it is immediately before the idling stop, if the travel engine 4 stops due to the idling stop, the temperature of an engine coolant (heat medium) drops, and a water pump stops. For that reason, the circulation of the coolant between the engine-cooling heat exchanger and the hot water heater core 20 stops. Hence, the air temperature blown from the hot water heater core 20 drops. For that reason, since the temperature of air sucked into the inside air inlet port 14c drops early, there is a risk that the air temperature blown into the vehicle interior from the driver's seat side outlet port drops early.

On the contrary, in the present embodiment, when it is determined that it is immediately before the idling stop, the front seat air conditioning mode (Step S28) is implemented even if it is determined that the occupant intensive air-conditioning mode can be implemented. For that reason, the hot air can be blown from the passenger's seat side foot outlet port 63 as the conditioned air. Hence, the room temperature in the passenger's seat side space within the vehicle interior can rise. For that reason, since temperature decrease of the air sucked into the inside air inlet port 14c when the idling stop is carried out can be limited, decrease of the air temperature blown into the vehicle interior from the outlet port can be restricted.

As described above, since the temperature change of the air sucked into the inside air inlet port 14c when the idling stop is carried out can be limited, a change of the air temperature blown into the vehicle interior from the outlet port can be restricted. Therefore, the temperature change in the vehicle interior can be limited.

In this example, in the case where it is determined that it is immediately before the idling stop, when the occupant intensive air-conditioning mode is implemented, the temperature of air sucked into the inside air inlet port 14c changes early. As a result, there is a risk that the air temperature blown into the vehicle interior from the outlet port changes early. For that reason, a period during which the idling stop is implemented may not be prolonged.

On the contrary, in the present embodiment, when it is determined that it is immediately before the idling stop, the front seat air conditioning mode is implemented so that the conditioned air can be blown out of the passenger's seat side foot outlet port 63 corresponding to the passenger's seat in which the occupant is not seated. For that reason, as described above, a change of the air temperature blown from the outlet port into the vehicle interior can be limited. Accordingly, the period during which the idling stop is implemented can be prolonged.

In the present embodiment, as described above, in implementing the front seat air conditioning mode, the opening and closing mechanisms 48 to 53 are controlled to blow the conditioned air from the passenger's seat side foot outlet port 63. For that reason, in implementing the front seat air conditioning mode, the conditioned air (that is, cold air or hot air) can be blown from the passenger's seat side foot outlet port 63 located at a place closer to the inside air inlet port 14c, of the passenger's seat side face outlet port 59 and the passenger's seat side foot outlet port 63. For that reason, the temperature in the vicinity of the inside air inlet port 14c can drop in the cooling operation, and the temperature in the vicinity of the inside air inlet port 14c can rise in the heating operation. Hence, the temperature change of air sucked into the inside air inlet port 14c can be further limited when the idling stop is carried out.

In the present embodiment, in implementing the front seat air conditioning mode, the passenger's seat side foot opening and closing mechanism 52 is controlled through the servo motor 70. As a result, the conditioned air blown from the passenger's seat side foot outlet port 63 is made smaller than the conditioned air blown from the driver's seat side outlet port. For that reason, an air conditioning energy for limiting a change in the inside air temperature at the time of idling stop can be suppressed.

In the present embodiment, when it is immediately before the idling stop, and the travel engine 4 is operating, the front seat air conditioning mode for stopping the blowing of the conditioned air from the rear seat side foot outlet port 65 is implemented in Step S28. For that reason, the blowing of the conditioned air from the rear seat side foot outlet port 65 located at a position away from the inside air inlet port 14c can stop. As a result, a wasteful consumption of the air conditioning energy can be suppressed in limiting a change in the temperature within the vehicle interior when the idling stop is carried out.

In the first embodiment, an example in which the air volume (hereinafter referred to as "passenger's seat air volume") blown from the passenger's seat side outlet ports (59, 63) is set to a constant volume in implementing the front seat air conditioning mode in Step S28 has been described.

Alternatively, the passenger's seat air volume may be changed according to the continuous operation time of the travel engine 4.

Figure 7:
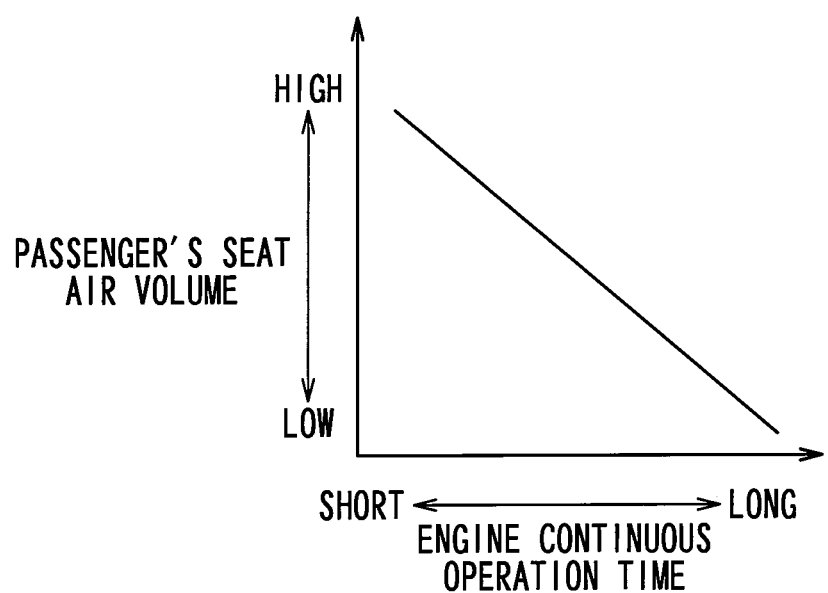
FIG. 7 is a diagram illustrating a relationship between an air volume blown to a passenger's seat side and a continuous operation time of the travel engine according to a modification of the first embodiment.

For example, as shown in a graph of FIG. 7, the passenger's seat side foot opening and closing mechanism 52 is controlled through the servo motor 70 to adjust an opening area of the passenger's seat side foot opening portion 46 so that the passenger's seat air volume increases more as the continuous operation time of the travel engine 4 becomes shorter.

FIG. 7 is a graph showing the passenger's seat air volume corresponding to the continuous operation time with the axis of ordinate as the passenger's seat air volume, and the axis of abscissa as the continuous operation time of the travel engine 4.

In this example, as the continuous operation time of the travel engine 4 is shorter, an operation rate of the compressor 1 per time becomes lower, and the continuous operation time of the water pump becomes shorter. For that reason, when the continuous operation time of the travel engine 4 is shorter, a cooling capacity for cooling the inside air by the evaporator 9 is reduced in the cooling operation, and a heating capacity for heating the inside air by the hot water heater core 20 is reduced in the heating operation. For that reason, a temperature difference between the set temperature Tset and the room temperature Tr increases. In association with the above phenomenon, there is a risk that the temperature of air sucked into the inside air inlet port 14c changes rapidly when the idling stop is carried out.

Under the above circumstances, as described above, the passenger's seat air volume increases more as the continuous operation time of the travel engine 4 is shorter, as a result of which a reduction of the cooling capacity of the evaporator 9 can be limited, and a reduction of the heating capacity of the hot water heater core 20 can be also limited. Hence, widening of a temperature difference between the set temperature Tset and the room temperature Tr can be restricted. In association with the above phenomenon, the temperature change of air sucked into the inside air inlet port 14c can be restricted rapidly when the idling stop is carried out.

Second Embodiment

In the above-mentioned first embodiment, the example in which when it is determined that the travel engine 4 is operating as no in Step S26 of FIG. 5, the front seat air conditioning mode is implemented in association with this determination has been described. Alternatively, in the present embodiment, a description will be given of an example in which when it is determined that the travel engine 4 is operating as no, and the air conditioning load within the vehicle interior is equal to or higher than a threshold, the front seat air conditioning mode is implemented.

Figure 8:
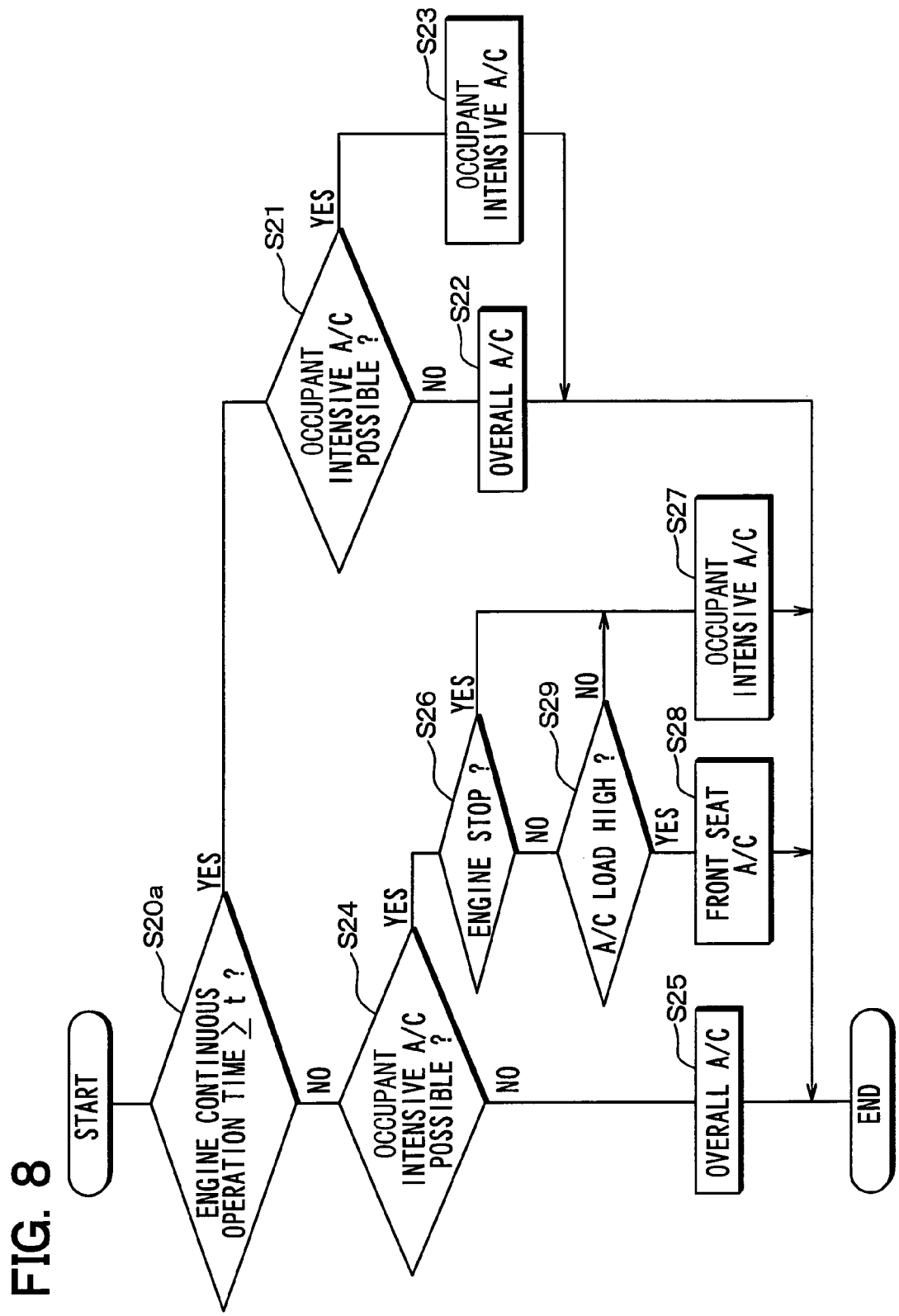
FIG. 8 is a flowchart illustrating a sub control process of an electronic control device according to a second embodiment of the present disclosure.

FIG. 8 is a flowchart illustrating a sub control process according to the present embodiment. In the present embodiment, a flowchart in FIG. 8 will be applied instead of the flowchart in FIG. 5. In FIG. 8, Step S29 is added between Step S26 and Step S28 in FIG. 5. Under the circumstances, hereinafter, in a description of the sub control process according to the present embodiment, a description of common steps between the flowchart in FIG. 8 and the flowchart in FIG. 5 will be omitted, and steps different therebetween will be described.

In the sub control process according to the present embodiment, when it is determined that the travel engine 4 is operating as no in Step S26, it is determined whether the air conditioning load within the vehicle interior is equal to or higher than a threshold, or not, with the use of the temperature difference between the room temperature Tr and the set temperature Tset in Step S29.

Specifically, if an absolute value |Tr−Tset| of the temperature difference between the room temperature Tr and the set temperature Tset is equal to or larger than a predetermined value, it is determined that the air conditioning load within the vehicle interior is equal to or higher than a threshold as yes in Step S29.

In association with the above determination, the process proceeds to Step S28, and in implementing the front seat air conditioning mode, the passenger's seat side foot opening and closing mechanism 52 is controlled through the servo motor 70. As a result, the passenger's seat air volume blown from the passenger's seat side foot outlet port 63 changes according to the absolute value |Tr−Tset|.

Figure 9:
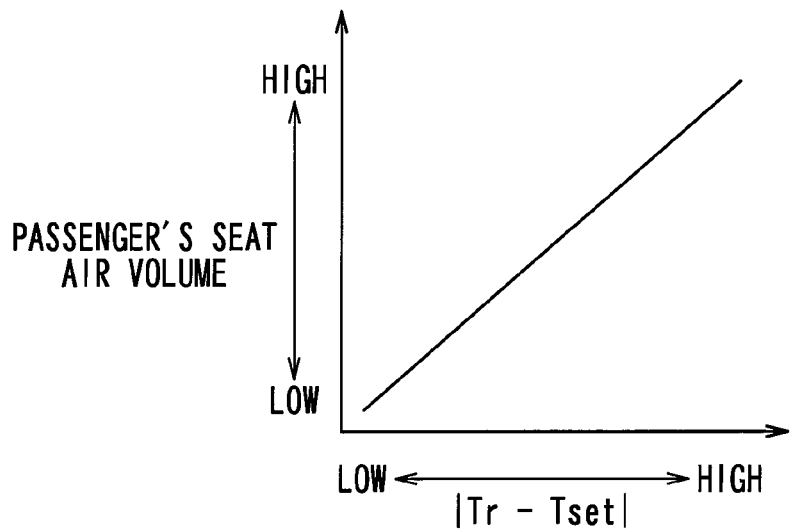
FIG. 9 is a diagram illustrating a relationship between an air volume blown to a passenger's seat side and an air conditioning load, which are used in the sub control process according to the second embodiment.

Specifically, as illustrated in FIG. 9, the passenger's seat air volume increases more as the absolute value |Tr−Tset| is higher. With the above phenomenon, the passenger's seat air volume increases more as the air conditioning load is higher. FIG. 9 is a graph showing a relationship between the absolute value |Tr−Tset| and the passenger's seat air volume.

Also, if the air conditioning load within the vehicle interior is lower than the threshold when the absolute value |Tr−Tset| is lower than the predetermined value, it is determined that the air conditioning load within the vehicle interior is lower than the threshold as no in the above Step S29. In association with the above determination, the occupant intensive air-conditioning mode is implemented in Step S27.

According to the present embodiment described above, when it is determined that the air conditioning load within the vehicle interior is equal to or higher than the threshold, the front seat air conditioning mode is implemented. For that reason, if the air conditioning load within the vehicle interior is lower than the threshold (that is, the air conditioning load is smaller), the front seat air conditioning mode can be avoided from being implemented. Therefore, in order to limit a change in the room temperature at the time of the idling stop, the air conditioning energy can be avoided from being consumed in vain. A portion of the air conditioning ECU 5 which conducts the control operation in Step S29 may exemplify a load determination unit that determines whether the air conditioning load within the vehicle interior is equal to or higher than the threshold, or not.

In the present embodiment, the passenger's seat air volume increases more as the air conditioning load is higher. Therefore, the temperature change of air sucked into the inside air inlet port 14c can be appropriately limited according to the air conditioning load when the idling stop is carried out.

In the above-mentioned second embodiment, a description has been given of the example in which it is determined whether the air conditioning load within the vehicle interior is equal to or higher than the threshold, or not, with the use of the absolute value |Tr−Tset| of the temperature difference between the room temperature Tr and the set temperature Tset. Alternatively, as in the following items (1), (2), and (3), it is determined whether the air conditioning load within the vehicle interior is equal to or higher than the threshold, or not, with the use of the target blowing temperature TAO, the ambient temperature Tam, or the amount of solar radiation Ts. (1) It may be determined whether the air conditioning load within the vehicle interior is equal to or higher than the threshold, or not, with the use of the target blowing temperature TAO.

Specifically, if the target blowing temperature TAO is equal to or higher than a first predetermined value, but lower than a second predetermined value (>the first predetermined value) higher than the first predetermined value, it may be determined that the air conditioning load within the vehicle interior may be lower than the threshold. It may be determined that the air conditioning load within the vehicle interior is equal to or higher than the threshold if the target blowing temperature TAO is equal to or lower than the first predetermined value. It may be determined that the air conditioning load within the vehicle interior is equal to or higher than the threshold if the target blowing temperature TAO is equal to or higher than the second predetermined value.

That is, if the target blowing temperature TAO falls within a predetermined range that is lower than the second predetermined value, and equal to or higher than the first predetermined value, it may be determined that the air conditioning load is lower than the threshold. On the other hand, if the target blowing temperature TAO falls out of the above predetermined range, it may be determined that the air conditioning load is equal to or higher than the threshold value in Step S29.

Figure 10:
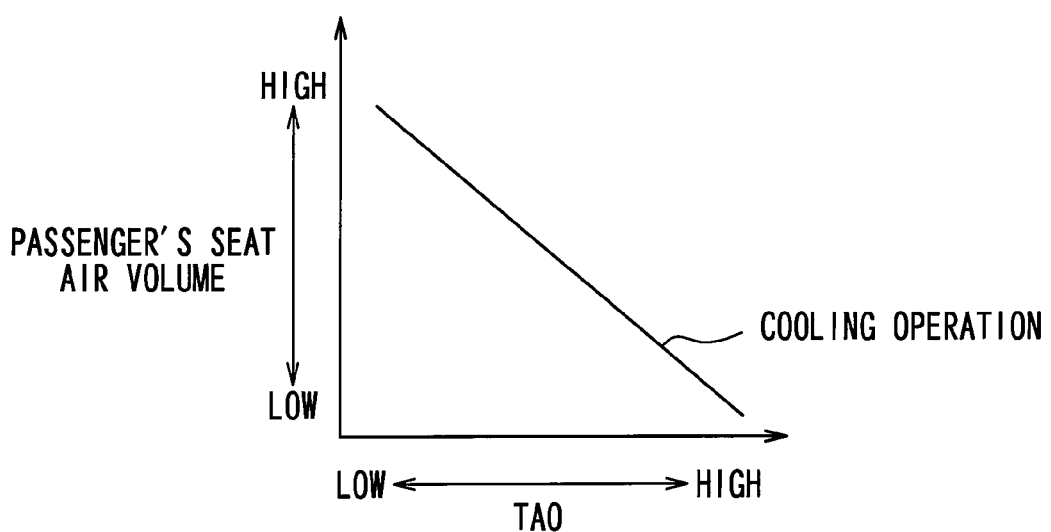
FIG. 10 is a diagram illustrating a relationship between an air volume blown to a passenger's seat side and a target blowing temperature TAO in cooling operation according to a modification of the second embodiment.

Also, in implementing the front seat air conditioning mode in Step S28 of FIG. 8, the passenger's seat side foot opening and closing mechanism 52 is controlled through the servo motor 70 so that the passenger's seat air volume may change according to the target blowing temperature TAO. Specifically, as shown in a graph of FIG. 10, in the cooling operation, the passenger's seat air volume increases more as the target blowing temperature TAO is lower, and in the heating operation, the passenger's seat air volume increases more as the target blowing temperature TAO is higher. As a result, as in the above second embodiment, the temperature change of air sucked into the inside air inlet port 14c can be appropriately limited according to the air conditioning load when the idling stop is carried out.

(2) It may be determined whether the air conditioning load within the vehicle interior is equal to or higher than the threshold, or not, with the use of the ambient temperature Tam. Specifically, if the ambient temperature Tam is lower than the first predetermined value, it may be determined that the air conditioning load within the vehicle interior is equal to or higher than the threshold as yes in Step S29. If the ambient temperature Tam is equal to or higher than the second predetermined value which is higher than the first predetermined value, it may be determined that the air conditioning load within the vehicle interior is equal to or higher than the threshold as yes in Step S29. On the other hand, if the ambient temperature Tam is equal to or higher than the first predetermined value, and lower than the second predetermined value, it may be determined that the air conditioning load within the vehicle interior is lower than the threshold as no in Step S29.

In association with the above determination, in implementing the front seat air conditioning mode in Step S28 of FIG. 8, the passenger's seat side foot opening and closing mechanism 52 is controlled through the servo motor 70 so that the passenger's seat air volume may change according to the ambient temperature Tam. Specifically, in the cooling operation, the passenger's seat air volume increases more as the ambient temperature Tam is higher. In the heating operation, the passenger's seat air volume increases more as the ambient temperature Tam is lower. As a result, as in the above second embodiment, the temperature change of air sucked into the inside air inlet port 14c can be appropriately restricted according to the air conditioning load when the idling stop is carried out.

(3) It may be determined whether the air conditioning load within the vehicle interior is equal to or higher than the threshold, or not, with the use of the amount of solar radiation Ts. For example, in summer (that is, in the cooling operation), if the amount of solar radiation Ts is equal to or higher than the first predetermined value, it is determined that the air conditioning load within the vehicle interior is equal to or higher than the threshold. If the amount of solar radiation Ts is lower than the first predetermined value, it is determined that the air conditioning load within the vehicle interior is lower than the threshold value. Similarly, in this case, in the cooling operation, the passenger's seat air volume may increase more as the amount of solar radiation Ts is higher.

Third Embodiment

In the above first and second embodiments, a description has been given of the example in which whether the continuous operation time of the travel engine 4 is lower than the predetermined time t, or not, is determined in Step S20a of the sub control process in FIG. 5, to thereby determine whether it is immediately before the idling stop, or not. Alternatively, the determination may be conducted as follows.

Figure 11:
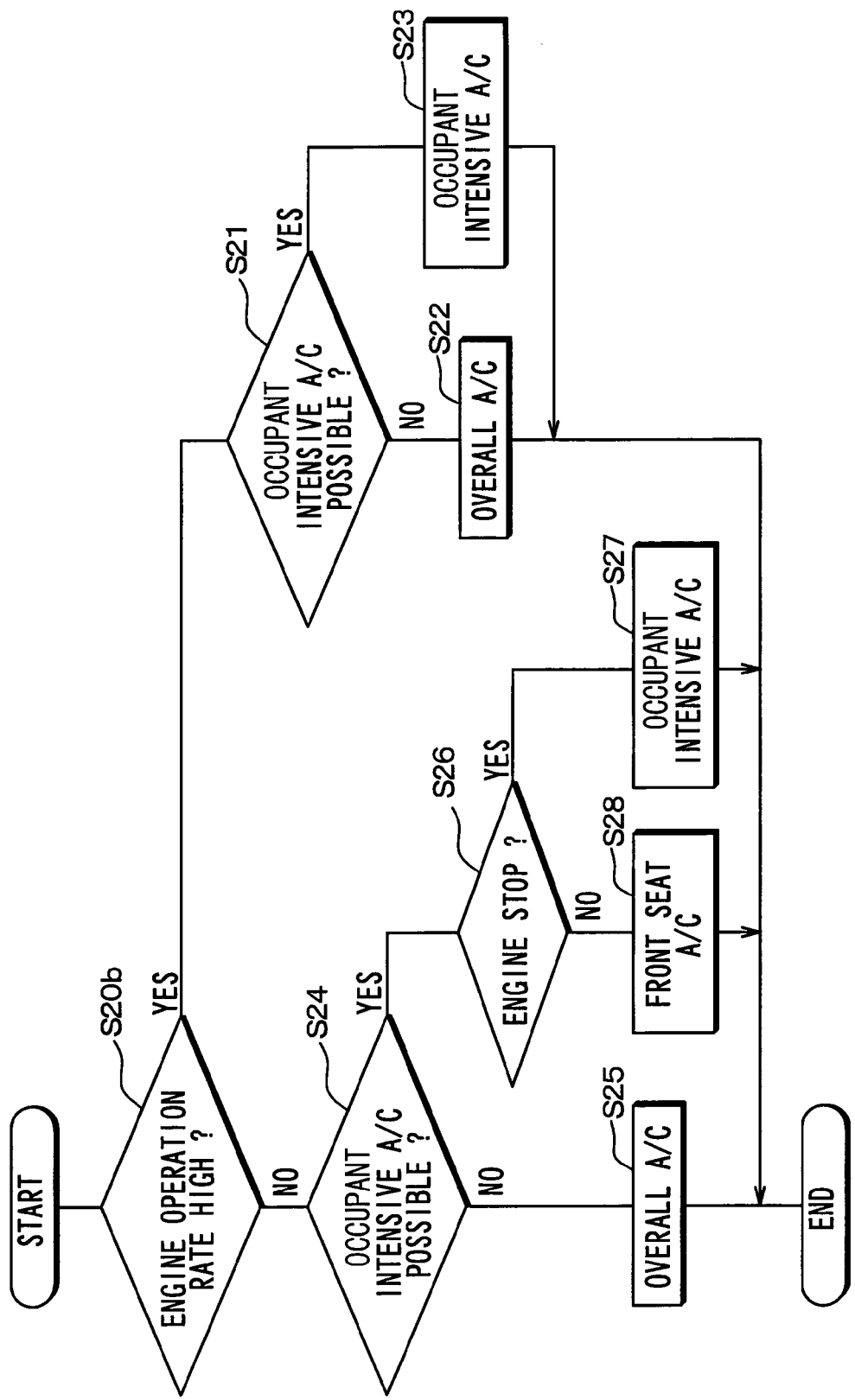
FIG. 11 is a flowchart illustrating a sub control process of an electronic control device according to a third embodiment of the present disclosure.

FIG. 11 is a flowchart illustrating a sub control process according to the present embodiment. A flowchart in FIG. 11 will be applied instead of the flowchart in FIG. 5. Steps other than Step S20b in FIG. 11 are identical with those in FIG. 5. Hereinafter, Step S20b in the present embodiment will be described.

In Step S20b of the present embodiment, the operation rate of the travel engine 4 is calculated on the basis of a signal output from the engine ECU 80. The operation rate of the travel engine 4 is a ratio of an operation time of the travel engine 4 to a predetermined time. It is determined whether the operation rate of the travel engine 4 is lower than a predetermined value, or not, to thereby determine whether it is immediately before the idling stop, or not.

If the operation rate of the travel engine 4 is equal to or higher than the predetermined value, it is determined that the operation rate of the travel engine 4 is high as yes in Step S20b. That is, it is determined that it is not immediately before the idling stop. On the other hand, if the operation rate of the travel engine 4 is lower than the predetermined value, it is determined that the operation rate of the travel engine 4 is low as no in Step S20b. That is, it is determined that it is immediately before the idling stop.

Figure 12:
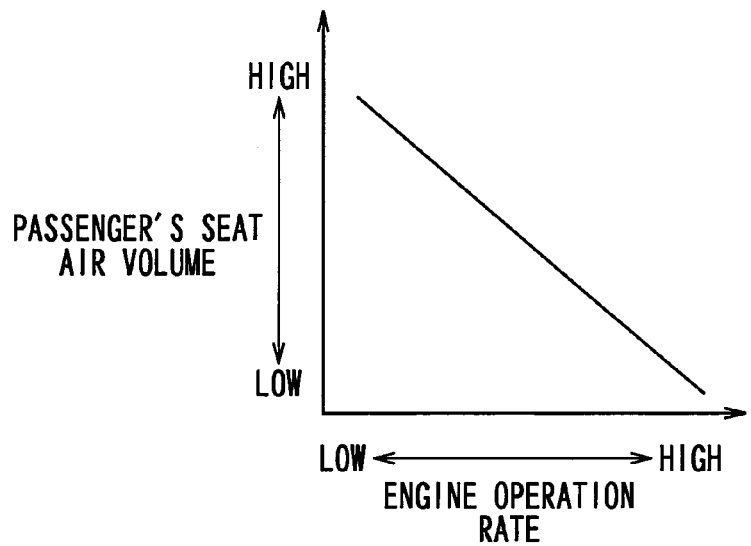
FIG. 12 is a diagram illustrating a relationship between an air volume blown to a passenger's seat side and an operation rate of a travel engine, which are used in the sub control process according to the third embodiment.

In the present embodiment, in implementing the front seat air conditioning mode (Step S28), as shown in a graph of FIG. 12 illustrating a relationship between the operation rate of the travel engine 4 and the passenger's seat air volume, the passenger's seat side foot opening and closing mechanism 52 is controlled through the servo motor 70 to adjust an opening area of the passenger's seat side foot opening portion 46 so that the passenger's seat air volume increases more as the operation rate of the travel engine 4 is lower.

According to the present embodiment described above, if the operation rate of the travel engine 4 is equal to or higher than the predetermined value, it is determined that it is not immediately before the idling stop. On the other hand, if the operation rate of the travel engine 4 is lower than the predetermined value, it is determined that it is immediately before the idling stop. With the above process, as in the above first and second embodiments, it can be appropriately determined whether it is immediately before the idling stop, or not.

In the present embodiment, as described above, the passenger's seat air volume increases more as the operation rate of the travel engine 4 is lower, as a result of which the room temperature in the passenger's seat side space within the vehicle interior can rise in the heating operation, and the room temperature in the passenger's seat side space within the vehicle interior can drop in the cooling operation. For that reason, as in the case where the passenger's seat air volume changes according to the continuous operation time of the travel engine 4 (refer to FIG. 7), widening of the temperature difference between the set temperature Tset and the room temperature Tr can be restricted when the idling stop is carried out.

Fourth Embodiment

In the above first and second embodiments, a description has been given of the example in which whether the continuous operation time of the travel engine 4 is lower than the predetermined time t, or not, is determined in Step S20a, to thereby determine whether it is immediately before the idling stop, or not. A description will be given of an example in which whether it is immediately before the idling stop, or not, is determined according to the number of installed traffic lights which are installed on a road (hereinafter referred to as "traveling road") on which the subject automobile is currently traveling, instead.

Figure 13:
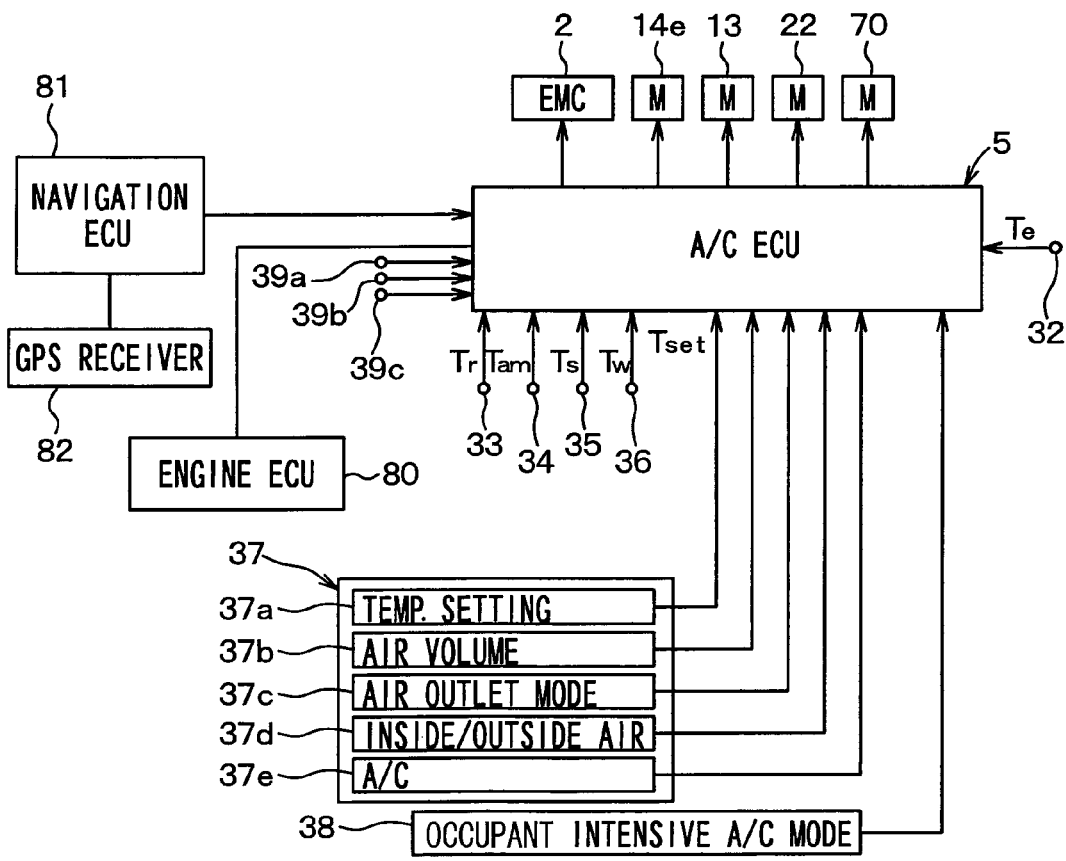
FIG. 13 is a schematic diagram illustrating an electric control unit according to a fourth embodiment of the present disclosure.

FIG. 13 illustrates a configuration of the electronic control unit according to the present embodiment. The air conditioning ECU 5 according to the present embodiment implements the air conditioning process according to the information acquired from a navigation ECU 81 through an in-vehicle LAN. The navigation ECU 81 includes a microcomputer and a memory. Map information (specifically, road information) including installed positions of the traffic lights is stored in the memory. The navigation ECU 81 calculates current position information on the basis of a received signal from a GPS receiver 82, and implements a process of searching a route that reaches a destination from a current location on the basis of the calculated position information and the map information stored in the memory, or acquiring information on the traveling road. The GPS receiver 82 receives radio signals transmitted from multiple GPS satellites.

Figure 14:
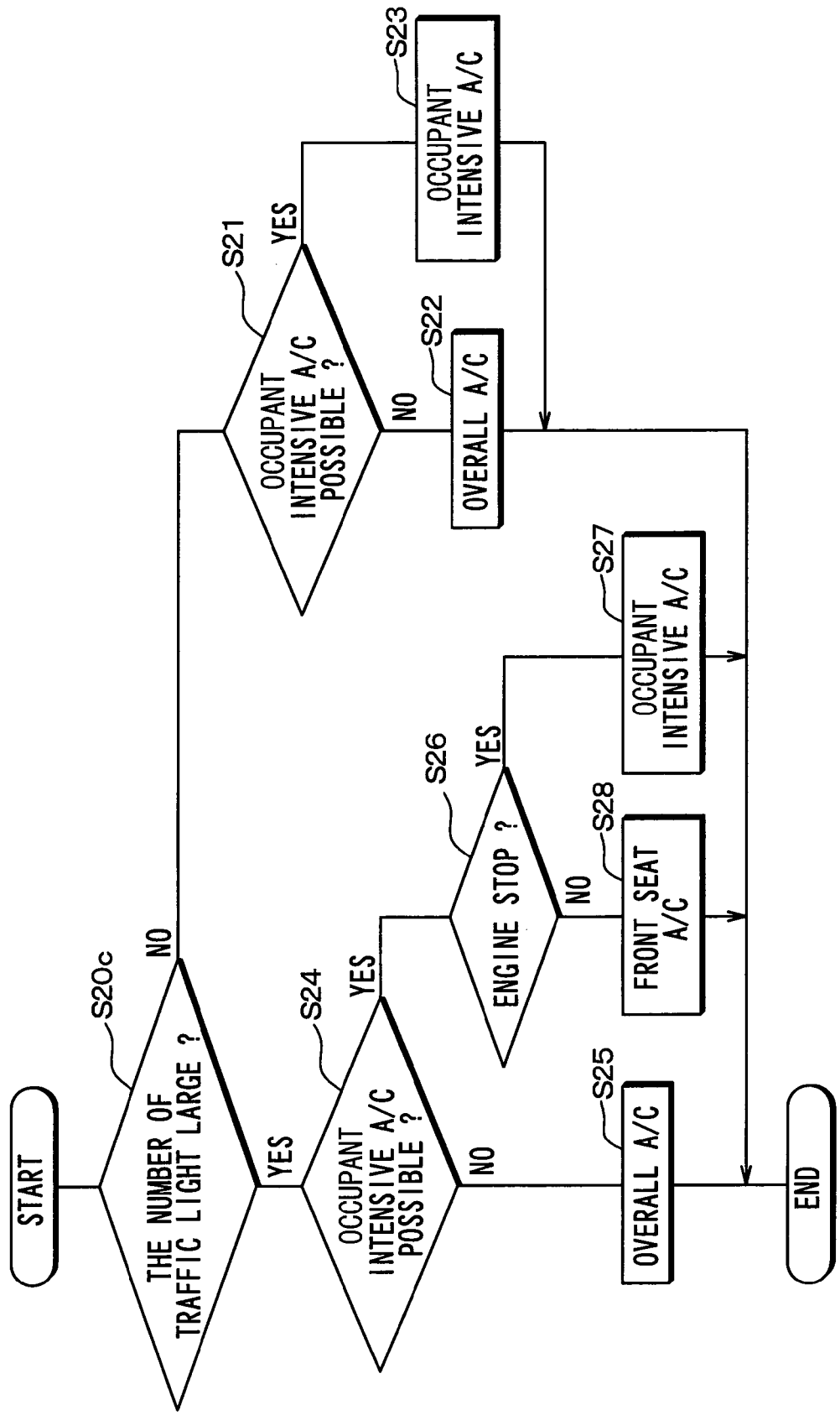
FIG. 14 is a flowchart illustrating a sub control process of the electronic control device according to the fourth embodiment.

The main control process in the air conditioning control process according to the present embodiment is identical with the main control process of the above first embodiment. Step S20c in the sub control process according to the present embodiment is different from the sub control process in the above first embodiment. Under the circumstances, Step S20c in the sub control process according to the present embodiment will be described. FIG. 14 is a flowchart illustrating the sub control process according to the present embodiment.

First, in Step S20c, in the navigation ECU 81, it is determined whether the number of traffic lights present at a predetermined distance in a travel direction of the vehicle on the traveling road is equal to or larger than a predetermined number, or not.

Specifically, the navigation ECU 81 searches the route information that reaches the destination on the basis of the map information and the position information detected by a GPS 40. The navigation ECU 81 determines whether the number of traffic lights present at the predetermined distance in the travel direction on the traveling road is equal to or larger than the predetermined number, or not, according to the searched route information and the map information. The navigation ECU 81 then transmits the determination result to the air conditioning ECU 5.

If the number of traffic lights present at a predetermined distance in the travel direction on the traveling road is smaller than the predetermined number, the air conditioning ECU 5 determines that the number of traffic lights is smaller as no in Step S20c. That is, it is determined that it is not immediately before the idling stop. If the number of traffic lights present at the predetermined distance in the travel direction on the traveling road is equal to or larger than the predetermined number, the air conditioning ECU 5 determines that the number of traffic lights is larger as yes in Step S20c. That is, it is determined that it is immediately before the idling stop.

According to the present embodiment described above, if the number of traffic lights present at the predetermined distance in the travel direction on the traveling road is smaller than the predetermined number, the air conditioning ECU 5 determines that it is not immediately before the idling stop. If the number of traffic lights present at the predetermined distance in the travel direction on the traveling road is equal to or larger than the predetermined number, the air conditioning ECU 5 determines that it is immediately before the idling stop. With the above process, as in the above first, second and third embodiments, it can be appropriately determined whether it is immediately before the idling stop, or not, on the basis of the information on the road acquired from the navigation ECU 81. The navigation ECU 81 and the GPS receiver 82 may exemplify the information acquisition device for acquiring information on the road on which the automobile travels.

Fifth Embodiment

In the above fourth embodiment, a description has been given of the example in which whether it is immediately before the idling stop, or not, is determined according to the number of installed traffic lights on the traveling road in Step S20c. A description will be given of an example in which whether it is immediately before the idling stop, or not, is determined on the basis of traffic jam information on the traveling road, instead.

Figure 15:
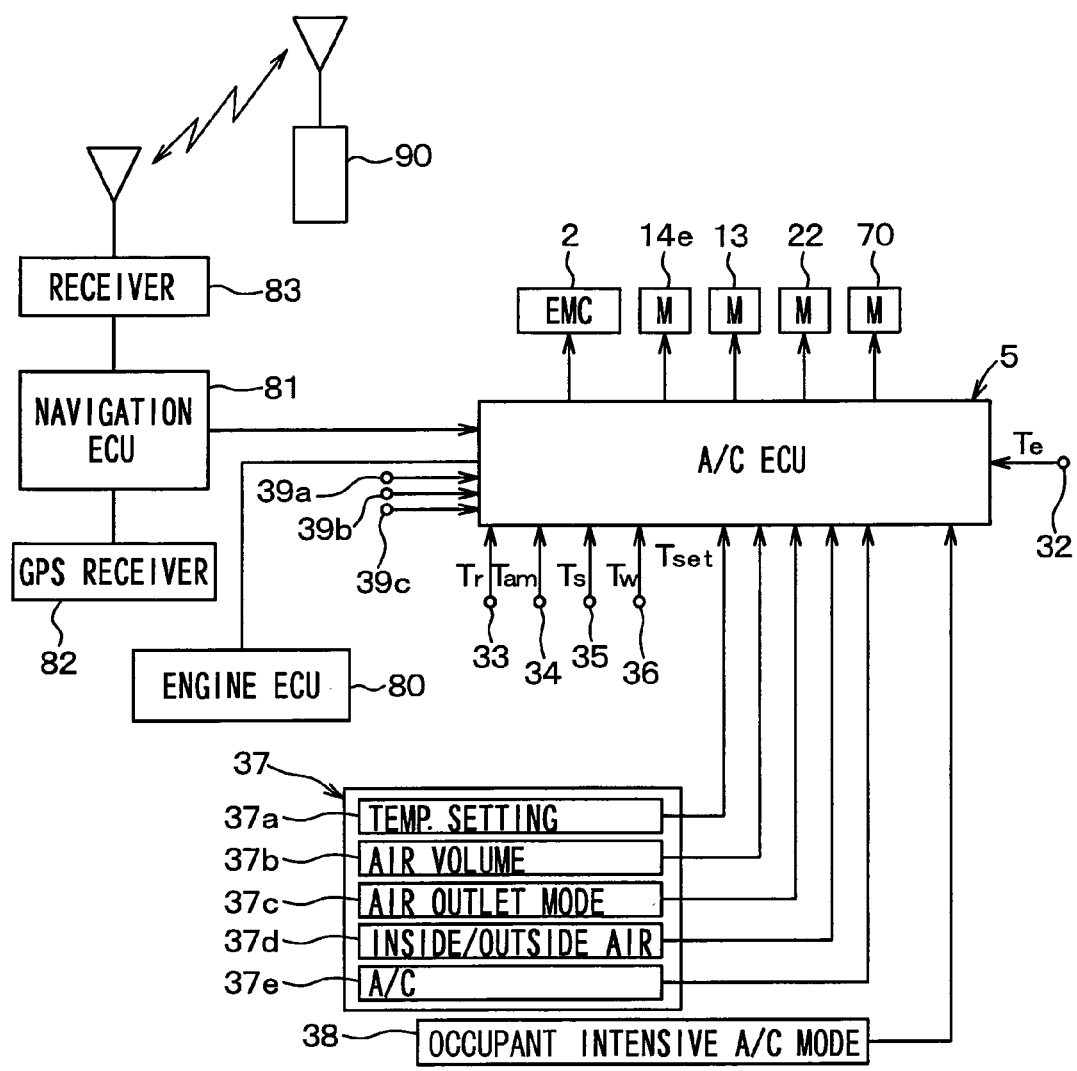
FIG. 15 is a schematic diagram illustrating an electric control unit according to a fifth embodiment of the present disclosure.

FIG. 15 illustrates a configuration of the electronic control unit according to the present embodiment. The navigation ECU 81 according to the present embodiment determines whether it is immediately before the idling stop, or not, according to the road information acquired by a receiver 83 (for example, a VICS receiver). The receiver 83 receives the traffic jam information on the road from a broadcast station 90 (for example, a VICS broadcast station) as a radio signal. VICS is a registered trademark.

Figure 16:
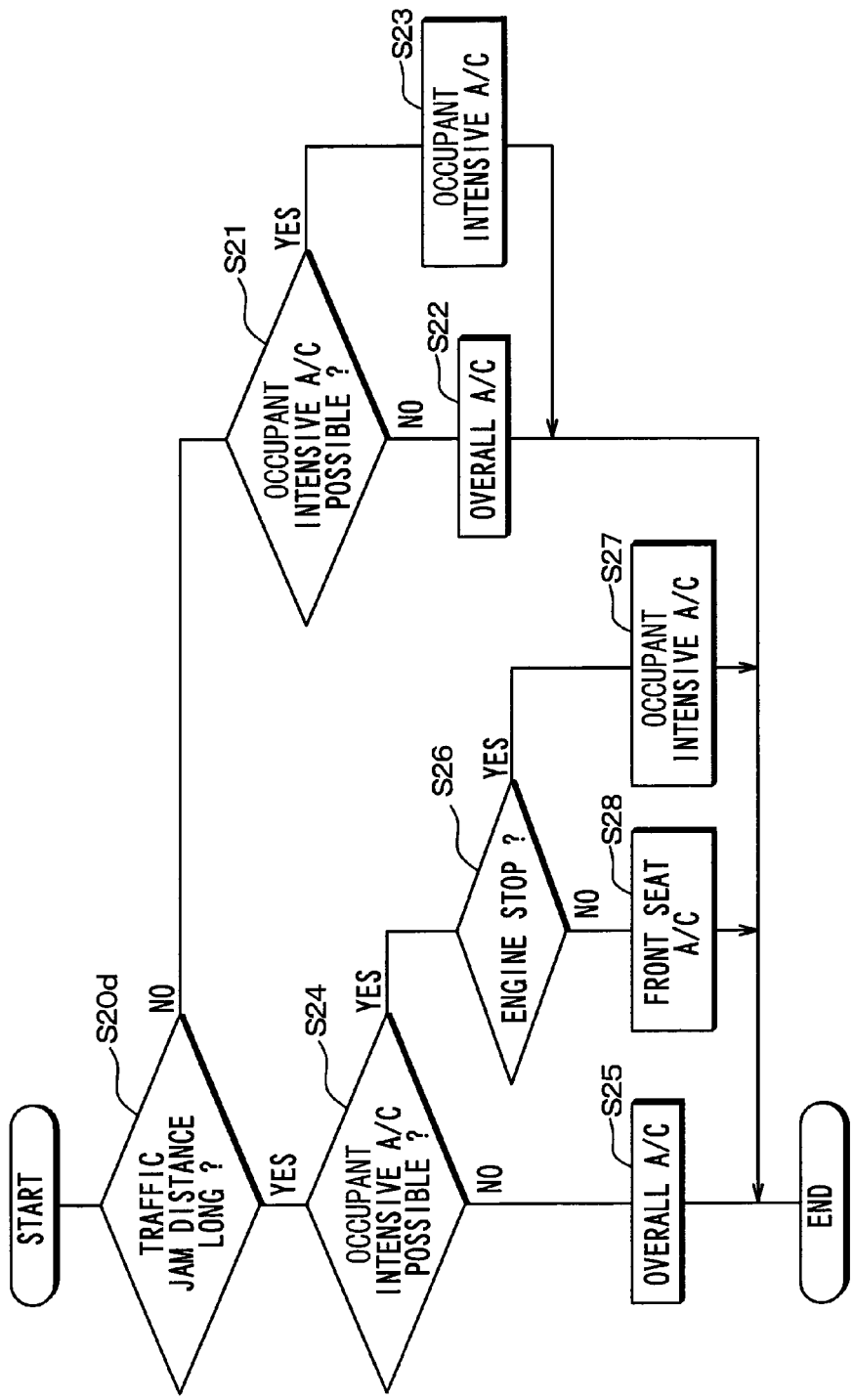
FIG. 16 is a flowchart illustrating a sub control process of an electronic control device according to the fifth embodiment.

The main control process in the air conditioning control process according to the present embodiment is identical with the main control process of the above first embodiment. Step S20d in the sub control process according to the present embodiment is different from the sub control process in the above first embodiment. Under the circumstances, Step S20d in the sub control process according to the present embodiment will be described. FIG. 16 is a flowchart illustrating the sub control process according to the present embodiment.

The navigation ECU 81 obtains a traffic jam distance of the vehicles in the travel direction on the traveling road on the basis of route information to a destination, current position information, and the traffic jam information on the road from the broadcast station 90, determines whether the traffic jam distance is equal to or longer than a predetermined distance, or not, and transmits the determination result to the air conditioning ECU 5, in Step S20*d*.

In this example, the air conditioning ECU 5 determines whether the traffic jam distance is equal to or longer than the predetermined distance, or not, to thereby determine whether it is immediately before the idling stop, or not. That is, if the traffic jam distance is shorter than the predetermined distance, the air conditioning ECU 5 determines that the traffic jam distance is long as no in Step S20*d*. That is, it is determined that it is not immediately before the idling stop. On the other hand, if the traffic jam distance is equal to or longer than the predetermined distance, the air conditioning ECU 5 determines that the traffic jam distance is short as yes in Step S20*d*. That is, it is determined that it is immediately before the idling stop. With the above process, as in the above first to fourth embodiments, it can be appropriately determined whether it is immediately before the idling stop, or not.

Figure 17:
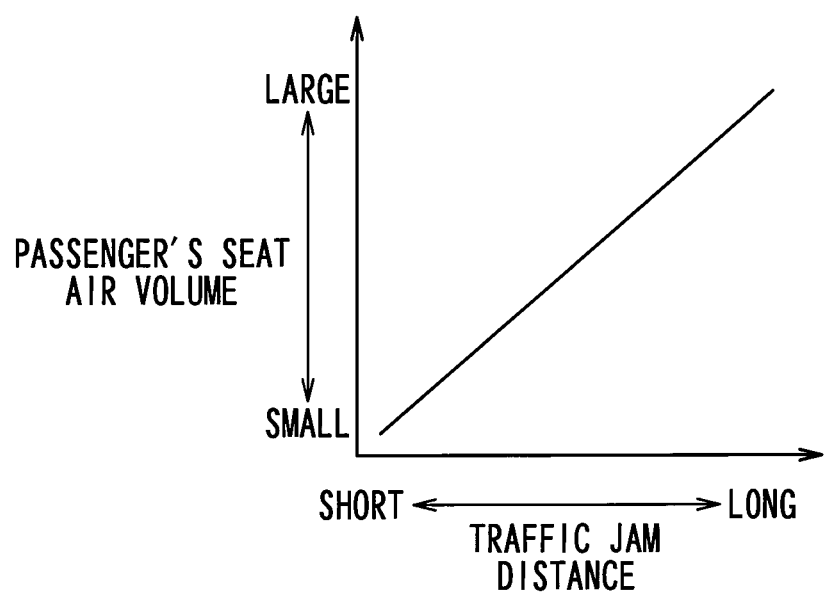
FIG. 17 is a diagram illustrating a relationship between an air volume blown to a passenger's seat side and a traffic jam distance, which are used in the sub control process according to the fifth embodiment.

In the present embodiment, in implementing the front seat air conditioning mode (Step S28), as shown in a graph of FIG. 17 illustrating a relationship between the traffic jam distance and the passenger's seat air volume, the passenger's seat side foot opening and closing mechanism 52 is controlled through the servo motor 70 to adjust the opening area of the passenger's seat side foot opening portion 46 so that the passenger's seat air volume increases more as the traffic jam distance is longer. For that reason, the passenger's seat air volume increases more as the traffic jam distance is longer. With the above process, the room temperature in the passenger's seat side space within the vehicle interior can rise in the heating operation, and the room temperature in the passenger's seat side space within the vehicle interior can drop in the cooling operation. For that reason, as in the above case where the passenger's seat air volume changes according to the continuous operation time of the travel engine 4 (refer to FIG. 7), widening of the temperature difference between the set temperature Tset and the room temperature Tr can be restricted when the idling stop is carried out.

The navigation ECU 81 and the receiver 83 according to the present embodiment may exemplify the information acquisition device for acquiring the traffic jam information on the road on which the subject automobile travels.

In the above first embodiment, a description has been given of the example in which when it is determined that the travel engine 4 is operating as no in Step S26, the front seat air conditioning mode for stopping the blowing of the conditioned air from the rear seat side outlet port, and blowing the conditioned air from the driver's seat side outlet port and the passenger's seat side outlet port is implemented. Instead, an all-seat air conditioning mode for blowing the conditioned air from the rear seat side outlet port, the driver's seat side outlet port, and the passenger's seat side outlet port may be implemented.

In the above-mentioned first embodiment, a description has been given of the example in which whether the occupant intensive air-conditioning mode is set, or not, is determined by the switch 38, to thereby determine whether the occupant intensive air-conditioning mode can be implemented, or not, in Step S21. Alternatively, it may be determined whether the occupant intensive air-conditioning mode may be implemented, or not, on the basis of the detection signals of the sensors 39*a*, 39*b*, and 39*c* (refer to FIG. 1) for detecting whether the occupants are seated in the driver's seat, the passenger's seat, and the rear seat, or not.

Specifically, when the air conditioning ECU 5 determines that the driver is seated in only the driver's seat among the driver's seat, the passenger's seat, and the rear seat, the air conditioning ECU 5 determines that the occupant intensive air-conditioning mode can be implemented as yes in Step S21. Also, when the air conditioning ECU 5 determines that the driver is seated in the driver's seat, and the occupant is seated in at least one of the passenger's seat and the rear seat, the air conditioning ECU 5 determines that the occupant intensive air-conditioning mode cannot be implemented as no in Step S21.

In the above first embodiment, a description has been given of the example in which the front seat air conditioning mode for stopping the blowing of the conditioned air from the rear seat side foot outlet port 65 is implemented in Step S28. Alternatively, the air conditioning mode for blowing the conditioned air from the driver's seat side outlet port, the passenger's seat side outlet port, and the rear seat side outlet port may be implemented in Step S28.

According to the above-mentioned first embodiment, a description has been given of the example in which the sensor 32 is arranged in a region on the downstream side of the evaporator 9 in the air flow. Instead, the sensor 32 may be arranged on the surface of the evaporator 9.

In the above first embodiment, a description has been given of the example in which in implementing the front seat air conditioning mode, the opening and closing mechanisms 48 to 53 are controlled to blow the conditioned air from the passenger's seat side foot outlet port 63 of the passenger's seat side outlet ports 59 and 63 as described above. Without being limited to this configuration, in implementing the front seat air conditioning mode, the opening and closing mechanisms 48 to 53 may be controlled to blow the conditioned air from the passenger's seat side face outlet port 59 of the passenger's seat side outlet ports 59 and 63. Alternatively, in implementing the front seat air conditioning mode, the opening and closing mechanisms 48 to 53 may be controlled to blow the conditioned air from the passenger's seat side face outlet port 59, and the passenger's seat side foot outlet port 63.

In the above fifth embodiment, a description has been given of the example in which whether the traffic jam distance is equal to or longer than the predetermined distance, or not, on the basis of the traffic jam information on the road acquired by the receiver 83, to thereby determine whether it is immediately before the idling stop, or not. Alternatively, the determination may be conducted by the following examples (1), (2), and (3).

(1) If the air conditioning ECU 5 determines that the road on which the subject automobile is currently traveling is a highway or a motorway, on the basis of the road information acquired from the navigation ECU 81, the air conditioning ECU 5 determines that it is not immediately before the idling stop. If the air conditioning ECU 5 determines that the road on which the subject automobile is currently traveling is a general road, the air conditioning ECU 5 may determine that it is immediately before the idling stop. Alternatively, when the traffic jam distance is long even if the subject automobile is traveling on the highway or the motorway, it is may be determined that it is immediately before the idling stop.

Figure 18:
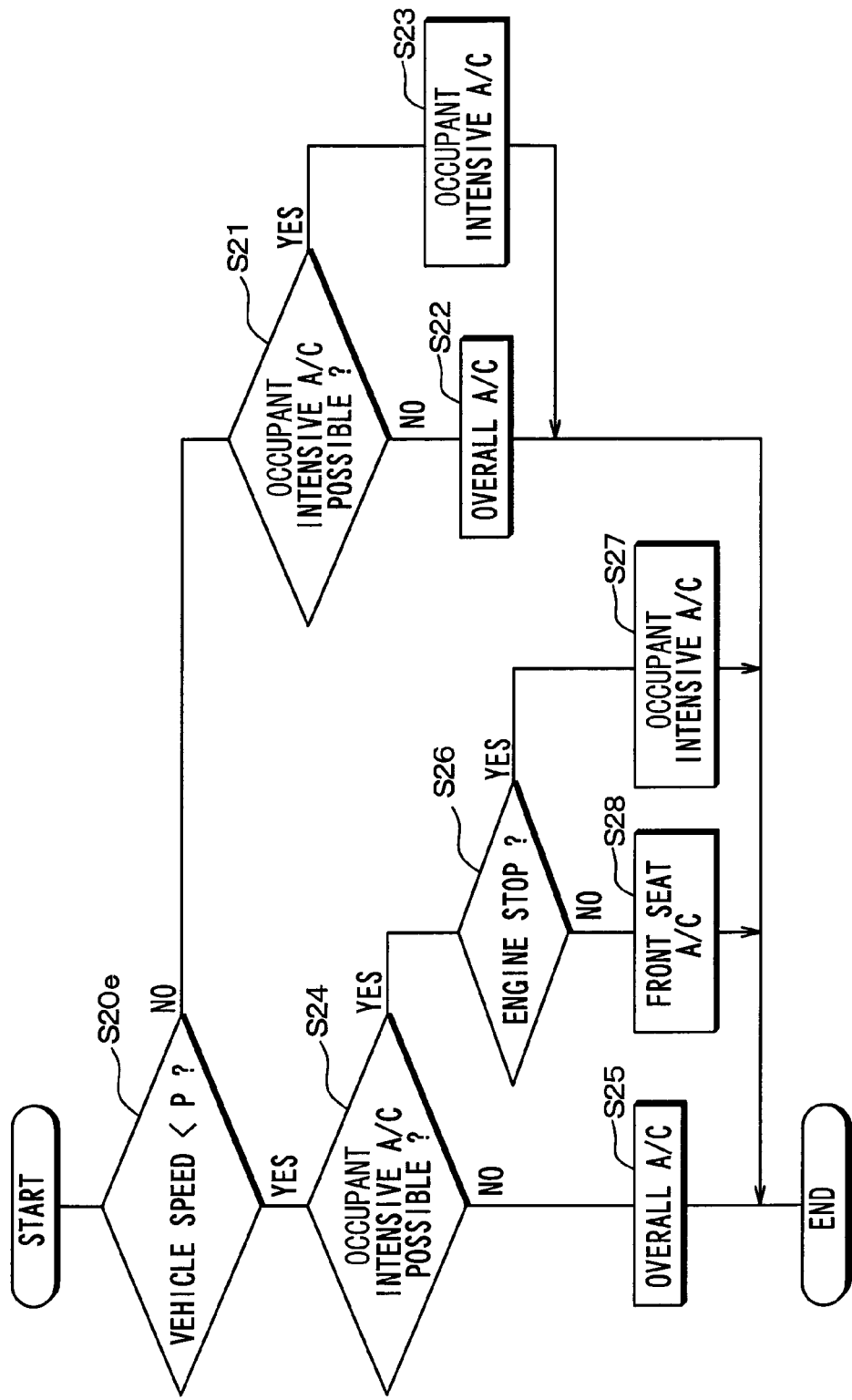
FIG. 18 is a flowchart illustrating a sub control process of an electronic control device according to one modification of the fifth embodiment.

(2) The air conditioning ECU 5 may determine whether a vehicle speed detected by the vehicle speed sensor is lower than a threshold P, or not, on the basis of an output signal of the vehicle speed sensor that detects the vehicle speed of the subject automobile as indicated in Step S20*e* of FIG. 18, to thereby determine whether it is immediately before the idling stop, or not.

(3) The air conditioning ECU 5 may determine whether a change rate of the vehicle speed detected by the vehicle speed sensor in a predetermined period is equal to or higher than a threshold PR, or not, on the basis of the output signal of the vehicle speed sensor that detects the vehicle speed of the subject automobile as indicated in Step S20*f* of FIG. 19, to thereby determine whether it is immediately before the idling stop, or not.

In this example, when it is assumed that a current time is Ta, a time before a predetermined period from the current time Ta (that is, a past time) is Tb, the vehicle speed of the current time Ta is SR1, and an average value of the vehicle speeds from the past time Tb to the current time Ta is Sav, a value (=SR1/Sav) obtained by dividing the vehicle speed SR1 of the current time Ta by the average value Sav represents the change rate of the vehicle speed in the predetermined period.

In the above fourth embodiment, a description has been given of the example in which the navigation ECU 81 determines whether the number of traffic lights present at the predetermined distance in the travel direction on the traveling road is equal to or larger than the predetermined number, or not, on the basis of the map information stored in the memory in advance. However, without being limited to this configuration, in a server connected to the navigation ECU 81 over a wireless communication network, it may be determined whether the number of traffic lights present at the predetermined distance in the travel direction on the traveling road is equal to or larger than the predetermined number, or not.

Specifically, the navigation ECU 81 transmits the position information detected by the GPS 40 to the server over the wireless communication network by means of an in-vehicle radio device (for example, a mobile phone). In this case, it is determined in the server whether the number of traffic lights present at the predetermined distance in the travel direction of the vehicle on the traveling road is equal to or larger than the predetermined number, or not, on the basis of the position information and the map information. The determination result is transmitted from the server to the navigation ECU 81 through the in-vehicle radio device. In association with the above operation, the navigation ECU 81 transmits the determination result to the air conditioning ECU 5. With the above operation, the air conditioning ECU 5 can identify the determination result of whether the number of traffic lights present at the predetermined distance in the travel direction of the vehicle on the traveling road is equal to or larger than the predetermined number, or not.

In the above first embodiment, the example in which the inside air inlet port 14*c* is opened on the passenger's seat side has been described. Alternatively, the inside air inlet port 14*c* may be opened on the rear seat side. In this case, if it is determined that it is immediately before the idling stop, the outlet port corresponding to the unseated seat in which the occupant is not seated may be set as the rear seat side outlet port, and the conditioned air may be blown from the rear seat side outlet port. That is, the conditioned air can be blown from the rear seat side outlet port as the outlet port that is located at a position closer to the inside air inlet port 14*c* among the outlet ports for the respective seats.

In the above first to fifth embodiments, a description has been given of the example in which the respective air temperatures blown from the driver's seat side outlet ports (57, 61, 67), the passenger's seat side outlet ports (59, 63), and the rear seat side foot outlet port 65 are adjusted by one air mix door 19. Alternatively, the air temperatures blown from the driver's seat side outlet ports (57, 61, 67), the air temperatures blown from the passenger's seat side outlet ports (59, 63), and the air temperature blown from the rear seat side foot outlet port 65 may be controlled, independently.

In the above first to fifth embodiments, a description has been given of the mode for blowing the conditioned air from only the driver's seat side outlet port among the driver's seat side outlet port, the passenger's seat side outlet port, and the rear seat side outlet port, as the occupant intensive air-conditioning mode. Alternatively, a mode for detecting the seats (hereinafter referred to as "seated seats") in which the occupants are actually seated among the multiple seats within the vehicle interior by the seating sensors 39*a*, 39*b*, and 39*c*, and blowing the condition air from only the outlet ports corresponding to the seated seats detected by the seating sensors may be used as the occupant intensive air-conditioning mode.

In the above first to fifth embodiments, a description has been given of the case in which the hot water heater core 20 and the evaporator 9 are installed in the vehicle air conditioner of the present disclosure. Alternatively, any one of the hot water heater core 20 and the evaporator 9 may be installed in the vehicle air conditioner of the present disclosure.

In the above first, second, third, fourth, and fifth embodiments, and the respective modifications, the combination of two or more embodiments appropriately combinable with each other may be implemented as the present disclosure.

The invention claimed is:

1. A vehicle air conditioner, comprising:
   a heat exchanger in which heat is exchanged between a heat medium that changes in temperature due to an energy output from a travel engine of an automobile and an inside air drawn through an inside air inlet port;
   a plurality of outlet ports at least one of which is disposed for each of seats of the automobile, the plurality of outlet ports being ports through which a conditioned air that has passed through the heat exchanger is blown out;
   a blowing control mechanism that permits or stops the blowing out of the conditioned air from the outlet port provided for each of the seats, wherein the blower control mechanism is configured to:
      perform an idling stop determination that determines whether it is before an idling stop in which the travel engine stops; and
      perform an air-conditioning-mode determination that determines whether an occupant intensive air-conditioning mode, in which the conditioned air is blown intensively to an occupant, can be performed;
   a first air conditioning control configured to control the blowing control mechanism to blow the conditioned air from at least one of the plurality of outlet ports, wherein the at least one of the plurality of outlet ports corresponds to a seated seat in which an occupant is seated; and
   a second air conditioning control configured to control the blowing control mechanism to blow the conditioned air from at least one of the plurality of outlet ports, wherein the at least one of the plurality of outlet ports corresponds to an unseated seat in which an occupant is not seated, wherein
   the first air conditioning control is configured to operate when the idling stop determination determines that it is not before the idling stop, and when the air-conditioning-mode determination determines that the occupant intensive air-conditioning mode can be implemented, and the second air conditioning control is configured to operate when the idling stop determination determines that it is before the idling stop, and when the air-conditioning-mode determination determines that the occupant intensive air-conditioning mode can be implemented.

2. The vehicle air conditioner according to claim 1, further comprising a vapor compression refrigeration cycle device including a compressor that compresses a refrigerant as the heat medium by a kinetic energy output from the travel engine, a cooler that cools the refrigerant which is discharged from the compressor and has a high temperature and a high pressure, a decompressor that decompresses the refrigerant cooled by the cooler to a low temperature and a low pressure and discharges the refrigerant, and a cooling heat exchanger in that the inside air is cooled via heat exchange with the refrigerant which is output from the decompressor and has the low temperature and low pressure, wherein the heat exchanger includes the cooling heat exchanger of the vapor compression refrigeration cycle device.

3. The vehicle air conditioner according to claim 1, wherein the heat exchanger includes a heating heat exchanger that heats the inside air via heat exchange with the heat medium having the temperature raised by a thermal energy output from the travel engine.

4. The vehicle air conditioner according to claim 1, further comprising an intensive-air-conditioning setting switch operated by the occupant to set the occupant intensive air-conditioning mode, wherein the air-conditioning-mode determination determines whether the occupant intensive air-conditioning mode can be implemented by determining whether the intensive-air-conditioning switch is set to the occupant intensive air-conditioning mode.

5. The vehicle air conditioner according to claim 1, further comprising a seating sensor that detects whether the occupant is seated in each of the seats separately, wherein the air-conditioning-mode determination determines that the occupant intensive air-conditioning mode can be implemented when the air-conditioning-mode determination determines based on detection of the seating sensor that an occupant is seated only in a driver's seat of the seats in the automobile.

6. The vehicle air conditioner according to claim 1, wherein the number of outlet ports provided for each of the seats is plural, and the second air conditioning control is configured to control the blowing control mechanism to blow the conditioned air from an outlet port disposed at a position closer to the inside air inlet port in the plurality of outlet ports corresponding to the unseated seats.

7. The vehicle air conditioner according to claim 6, wherein the outlet port disposed at the position closer to the inside air inlet port is a foot outlet port through which the conditioned air is blown toward a foot area of the occupant.

8. The vehicle air conditioner according to claim 1, wherein the plurality of outlet ports includes a rear seat outlet port corresponding to a seat located rearward of a driver's seat and a passenger's seat of the seats, and the second air conditioning control is configured to control the blowing control mechanism to stop blowing of the conditioned air from the rear seat outlet port, and to blow the conditioned air from the outlet port corresponding to the unseated seat.

9. The vehicle air conditioner according to claim 1, wherein the idling stop determination determines whether it is before the idling stop by determining whether an operation rate of the travel engine per time is lower than a threshold.

10. The vehicle air conditioner according to claim 1, wherein the idling stop determination determines whether it is before the idling stop by determining whether a continuous operation time of the travel engine is lower than a threshold.

11. The vehicle air conditioner according to claim 1, wherein the idling stop determination determines whether it is before the idling stop, by determining whether a speed of the automobile is lower than a threshold.

12. The vehicle air conditioner according to claim 1, wherein the idling stop determination determines whether it is before the idling stop by determining whether a change rate of the speed of the automobile is equal to or higher than a threshold.

13. The vehicle air conditioner according to claim 1, further comprising an information acquisition device that acquires information on a road on which the automobile travels, wherein the idling stop determination determines whether it is before the idling stop by determining whether the number of traffic lights located within a predetermined distance in a vehicle travel direction on a road, on which the automobile travels, is larger than or equal to a predetermined number on the basis of the information acquired by the information acquisition device.

14. The vehicle air conditioner according to claim 1, further comprising performing a load determination that determines whether a load of air conditioning of a vehicle interior is equal to or higher than a threshold, wherein the second air conditioning control is configured to control the blowing control mechanism to blow the conditioned air from the outlet port corresponding to the unseated seat when the load determination determines that the load of air conditioning of the vehicle interior is equal to or higher than the threshold, and when the idling stop determination determines that it is before the idling stop.

15. The vehicle air conditioner according to claim 14, further comprising:

an inside air sensor that detects an air temperature of the vehicle interior;

a temperature setting device that sets a set temperature of the air temperature of the vehicle interior; and a temperature control configured to control the air temperature blown from the outlet port provided for each of the seats such that the detection temperature of the inside air sensor approaches the set temperature, wherein the load determination determines whether the load of air conditioning of the vehicle interior is equal to or higher than the threshold by determining whether an absolute value of a temperature difference between the detection temperature of the inside air sensor and the set temperature is equal to or higher than a threshold value.

16. The vehicle air conditioner according to claim 14, further comprising:

an inside air sensor that detects an air temperature of the vehicle interior;

a temperature setting device that sets a set temperature of the air temperature of the vehicle interior;

a temperature calculator configured to calculate a target blowing temperature of the conditioned air blown from the outlet port for making the detection temperature of the inside air sensor approach the set temperature; and a temperature control configured to control the air temperature blown from the outlet port provided for each of the seats such that the temperature of the conditioned air blown from the outlet port approaches the target blowing temperature, wherein the load determination determines whether the load of air conditioning of the vehicle interior is equal to or higher than the threshold by determining whether the target blowing temperature falls outside a predetermined range.

17. The vehicle air conditioner according to claim 1, wherein the blowing control mechanism adjusts an air volume blown from each of the outlet ports separately.

18. The vehicle air conditioner according to claim 17, wherein the second air conditioning control is configured to control the blowing control mechanism to increase the air volume of the conditioned air blown from the outlet port corresponding to the unseated seat with increase of the load of air conditioning of the vehicle interior.

19. The vehicle air conditioner according to claim 17, wherein the second air conditioning control is configured to control the blowing control mechanisms to make an air volume blown from the outlet port corresponding to the unseated seat become smaller than an air volume output from the outlet port corresponding to the seated seat.

20. The vehicle air conditioner according to claim 1, further comprising a traffic jam information acquisition device that acquires traffic jam information on a road on which the automobile travels, wherein the idling stop determination determines whether it is before the idling stop by determining whether a distance of a traffic jam generated in a travel direction on a road on which the automobile travels is longer than or equal to a predetermined distance, on the basis of the traffic jam information acquired by the traffic jam information acquisition device.

21. The vehicle air conditioner according to claim 20, wherein the blowing control mechanism adjusts an air volume blown from each of the outlet ports separately, and the second air conditioning control is configured to control the blowing control mechanism to increase the air volume of the conditioned air blown from the outlet port corresponding to the unseated seat with increase of the traffic jam distance on the road based on the traffic jam information.

* * * * *